(12) United States Patent
Yankowitz

(10) Patent No.: US 11,183,881 B2
(45) Date of Patent: Nov. 23, 2021

(54) INJECTION MOLDING ELECTROPLATING FOR THREE-DIMENSIONAL ANTENNAS

(71) Applicant: Yank Technologies, Inc., Brooklyn, NY (US)

(72) Inventor: Joshua Aaron Yankowitz, Brooklyn, NY (US)

(73) Assignee: Yank Technologies, Inc., Brooklyn, NY (US)

( * ) Notice: Subject to any disclaimer, the term of this patent is extended or adjusted under 35 U.S.C. 154(b) by 499 days.

(21) Appl. No.: 16/007,967

(22) Filed: Jun. 13, 2018

(65) Prior Publication Data

US 2018/0294677 A1 Oct. 11, 2018

Related U.S. Application Data

(63) Continuation-in-part of application No. 15/759,473, filed as application No. PCT/US2016/051375 on Sep. 12, 2016, now Pat. No. 10,644,542.

(Continued)

(51) Int. Cl.
  *B29C 45/00* (2006.01)
  *H01F 38/14* (2006.01)
  (Continued)

(52) U.S. Cl.
  CPC ......... *H02J 50/12* (2016.02); *B29C 45/0053* (2013.01); *H01F 5/003* (2013.01);
  (Continued)

(58) Field of Classification Search
  USPC ...................................................... 307/104
  See application file for complete search history.

(56) References Cited

U.S. PATENT DOCUMENTS

2003/0030593 A1*  2/2003  Tomomatsu ......... H01Q 1/2283
                                                              343/895
2004/0232845 A1  11/2004  Baarman et al.
(Continued)

FOREIGN PATENT DOCUMENTS

CN        101141081 A       3/2008
CN        102172322 A       9/2011
(Continued)

OTHER PUBLICATIONS

International Search Report and Written Opinion in PCT/US2016/051375, dated Dec. 8, 2016.
(Continued)

*Primary Examiner* — Toan T Vu
*Assistant Examiner* — Xuan Ly
(74) *Attorney, Agent, or Firm* — Perkins Coie LLP

(57) ABSTRACT

An antenna fabrication method includes depositing a conductive material on a surface of a double injection mold that includes a first surface portion comprising a primary material corresponding to a slot of the antenna and a second surface portion comprising an overmold material corresponding to a conductive surface of the antenna such that conductive material does not deposit on the primary material while it deposits on the secondary material, thereby resulting in multiple loops of the conductive material on the surface of the double injection mold, and providing two contact points to the conductive material, the contact points being separated from each other by a gap in the conductive material.

19 Claims, 21 Drawing Sheets

Related U.S. Application Data

(60) Provisional application No. 62/217,669, filed on Sep. 11, 2015.

(51) Int. Cl.

| | | |
|---|---|---|
| *H01Q 1/38* | (2006.01) | |
| *H02J 5/00* | (2016.01) | |
| *H02J 50/12* | (2016.01) | |
| *H02J 50/40* | (2016.01) | |
| *H02J 7/02* | (2016.01) | |
| *H01Q 7/00* | (2006.01) | |
| *H01F 5/00* | (2006.01) | |
| *H01F 41/04* | (2006.01) | |
| *H01Q 21/29* | (2006.01) | |
| *H02J 50/23* | (2016.01) | |
| *B29L 31/34* | (2006.01) | |
| *H01F 5/02* | (2006.01) | |

(52) U.S. Cl.
CPC ........... *H01F 38/14* (2013.01); *H01F 41/041* (2013.01); *H01Q 1/38* (2013.01); *H01Q 7/00* (2013.01); *H01Q 21/29* (2013.01); *H02J 5/005* (2013.01); *H02J 7/025* (2013.01); *H02J 50/23* (2016.02); *H02J 50/40* (2016.02); *B29L 2031/3456* (2013.01); *H01F 2005/027* (2013.01)

(56) References Cited

U.S. PATENT DOCUMENTS

| | | |
|---|---|---|
| 2007/0073353 A1 | 3/2007 | Rooney |
| 2008/0049372 A1 | 2/2008 | Loke |
| 2012/0146575 A1 | 6/2012 | Armstrong |
| 2013/0033118 A1 | 2/2013 | Karalis |
| 2013/0069587 A1 | 3/2013 | Kuk |
| 2013/0300205 A1 | 11/2013 | Tzanidis et al. |
| 2014/0176282 A1 | 6/2014 | Jung et al. |
| 2014/0184155 A1 | 7/2014 | Cha |
| 2014/0306656 A1 | 10/2014 | Tabata |
| 2014/0340031 A1 | 11/2014 | Mi et al. |
| 2015/0180266 A1 | 6/2015 | McFarthing et al. |
| 2016/0141882 A1 | 5/2016 | Ichikawa |
| 2018/0342896 A1 | 11/2018 | Zhang et al. |

FOREIGN PATENT DOCUMENTS

| | | |
|---|---|---|
| CN | 102217168 A | 10/2011 |
| CN | 102725940 A | 10/2012 |
| CN | 102906964 A | 1/2013 |
| CN | 10351606 A | 1/2014 |
| EP | 2276145 A1 | 1/2011 |
| EP | 2352219 A1 | 8/2011 |
| JP | 200927321 A | 11/2009 |
| JP | 2011155733 A | 8/2011 |
| JP | 2012517792 A | 8/2012 |
| WO | 2010055771 A1 | 5/2010 |
| WO | 2013105279 A1 | 7/2013 |

OTHER PUBLICATIONS

Australian Examination Report No. 1 for Standard Patent Application for Application No. 2016321421 dated Nov. 14, 2019, 3 pages.
R. Carta, et al. "Wireless powering for a self-propelled and steerable endoscopic capsule for stomach inspection" Biosensors and Bioelectronics, (2009), vol. 25, No. 4, pp. 845-851.
EP Office Action for EP Appl. No. 16 845 292.8, dated Mar. 5, 2020, 7 pages.
International Preliminary Report on Patentability in PCT/US2016/051375, dated Mar. 13, 2018.
Lee, et al. "Surface Spiral Coil Design Methodologies for High Efficiency, High Power, Low Flux Density, Large Air-Gap Wireless Power Transfer Systems" XP032410572, Applied Power Electronics Conference and Exposition APEC), 2013, 28th Annual IEEE, Mar. 17, 2013, pp. 1783-1790.
Q. Fu, et al. "A Control System of the Wireless Microrobots in Pipe" 2014 IEEE International Conference On Mechatronics and Automation (2014), pp. 1995-2000.
Supplementary European Search Report from related European Patent Application No. EP16845292 dated Mar. 21, 2019.
Translated) Office Action for Chinese Application No. 201680063806.2, dated Dec. 15, 2020, 37 pages.
Translated) Office Action for Japanese Application No. 2018-532529, dated Nov. 4, 2020, 28 pages.
USPTO, Non-Final Office Action dated Apr. 7, 2021 for U.S. Appl. No. 16/866,328, 19 pages.

* cited by examiner

INJECTION MOLDING ELECTROPLATING FOR THREE-DIMENSIONAL ANTENNAS

PRIORITY CLAIM

This patent document is a continuation-in-part of U.S. patent application Ser. No. 15/759,473, filed on Mar. 12, 2018, titled "WIRELESS CHARGING PLATFORMS VIA THREE-DIMENSIONAL PHASED COIL ARRAYS," which is a § 371 of International Application No. PCT/US16/51375, filed on Sep. 12, 2016, titled "WIRELESS CHARGING PLATFORMS VIA THREE-DIMENSIONAL PHASED COIL ARRAYS", which claims the benefit of U.S. Provisional Patent Application No. 62/217,669, filed Sep. 11, 2015, titled "WIRELESS CHARGING PLATFORMS VIA THREE-DIMENSIONAL PHASED COIL ARRAYS." The entire content of the before-mentioned patent applications is incorporated by reference as part of this patent document.

TECHNICAL FIELD

This patent document relates to antenna design, antenna efficiency, and antenna production for systems, devices, and processes that use wireless communication and wireless charging technologies.

BACKGROUND

Last few years has seen an explosive growth in the number of battery-operated devices such as smartphones and tablet computers. The high-resolution displays and transceiver electronics of these devices consume power during operation and users often have to charge their devices on a daily basis. Easy-to-use and low-cost battery charging technologies will thus facilitate even greater adoption and use of user devices.

SUMMARY

Techniques for fabrication of antennas used in electronic devices are disclosed. In one aspect, the disclosed fabrication techniques deposit a conductive material on a double injection mold to produce an antenna having multiple loops.

In one example aspect, an antenna fabrication method is disclosed. The method includes depositing a conductive material on a surface of a double injection mold that includes a first surface portion comprising a primary material corresponding to a slot of the antenna and a second surface portion comprising an overmold material corresponding to a conductive surface of the antenna such that conductive material does not deposit on the primary material while it deposits on the secondary material, thereby resulting in multiple loops of the conductive material on the surface of the double injection mold, and providing two contact points to the conductive material, the contact points being separated from each other by a gap in the conductive material.

In another example aspect, another antenna fabrication method is disclosed. The method includes inserting a slot in a single material injection mold with a plating-resistant material such that that a conductive material does not deposit on the slot, depositing, after the inserting, a conductive material on a surface of the single material injection mold such that the slot corresponds to a non-conductive surface of the antenna, thereby resulting in multiple loops of the conductive material, and providing two contact points to the conductive material, the contact points being separated from each other by a gap in the conductive material.

In yet another example aspect, another method of antenna fabrication is disclosed. The method includes depositing a conductive material on the surface of a single material injection mold comprising a plastic, milling a slot into the plastic after the depositing of the conductive material, thereby resulting in multiple loops of the conductive material on the surface of the plastic, and providing two contact points to the conductive material, the contact points being separated from each other by a gap in the conductive material.

In another example aspect, a wireless power system is disclosed. The wireless power system includes a wireless charging transmitter device including a power source electrically coupled to an array of three-dimensional (3D) antennas, wherein each 3D antenna includes a conductive material having multiple windings, wherein the multiple windings are electrically separated from each other by a single continuous slot, wherein the array is arranged such that at least two 3D antennas are acute or perpendicular to each other, and wherein each 3D antenna comprises multiple windings of at least one of (1) a conductive material deposited on a surface of a single-material injection mold having a slot running along a length of the single-material injection mold, the slot positioned to provide electrical isolation to the multiple loops of conductive surface that are formed by deposition of conductive material on the single-material injection mold or (2) a conductive material deposited on a surface of a double injection mold to form a first surface portion comprising a primary material corresponding to the slot and a second surface portion comprising an overmold material corresponding to a conductive portion of the coil.

In yet another example aspect, a wireless charging transmitter device is disclosed. The device includes a power source, a coil array electrically coupled to the power source and structured to include two or more coils to produce an electromagnetic field that emanates from the coil array, wherein the coils are arranged such that at least two coils are acute or perpendicular to each other to direct the electromagnetic field. Each coil includes multiple windings of a conductive material deposited on a surface of a double injection mold to form a first surface portion comprising a primary material corresponding to a slot of the coil and a second surface portion comprising an overmold material corresponding to a conductive portion of the coil; wherein the wireless charging transmitter device is operable to wirelessly charge an electronic device by providing the electromagnetic field at a receiver coil of the electronic device to convert the electromagnetic energy to electrical energy to power the electronic device.

These, and other, aspects are further described in this document.

DETAILED DESCRIPTION

Figure 1:
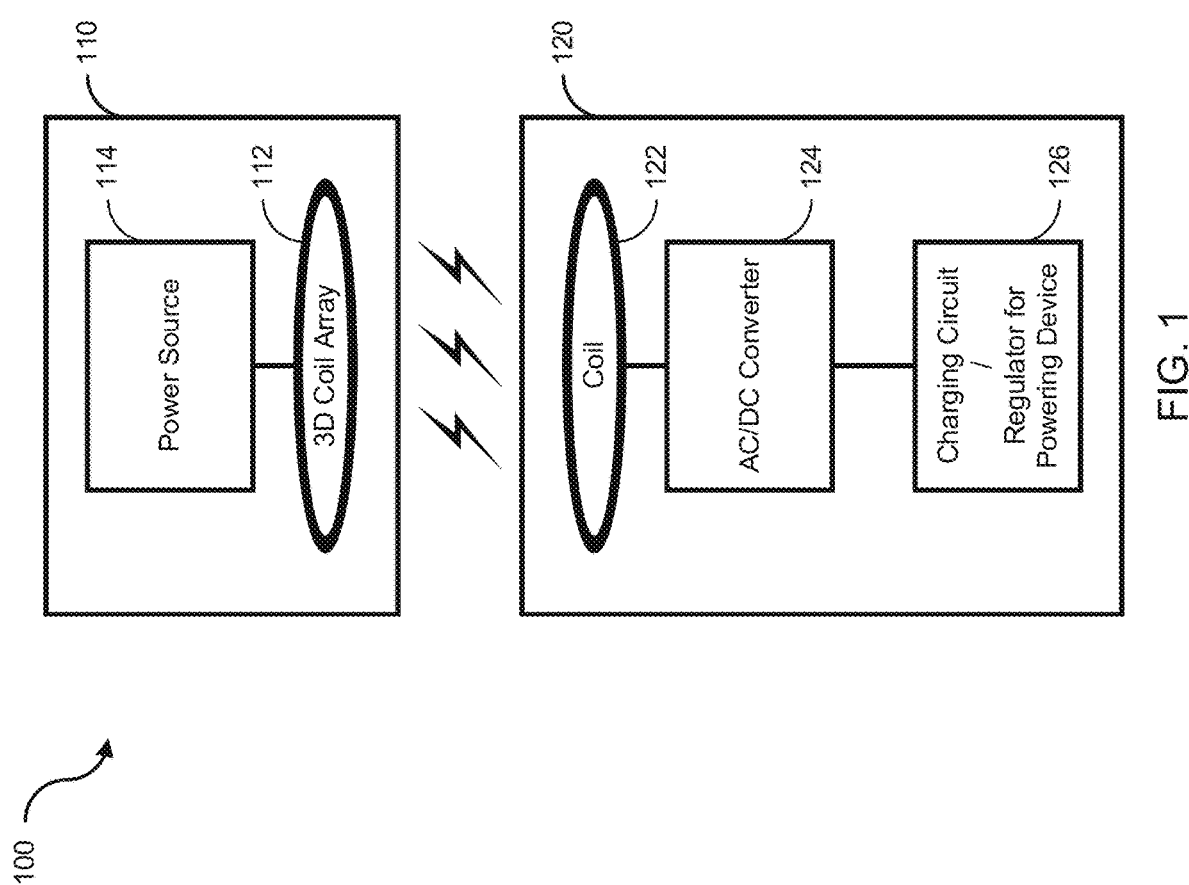
FIG. 1 shows a block diagram of an example resonant inductive wireless power system of the disclosed technology.

Wireless power transmission was first famously demonstrated by Nikola Tesla in 1893. Since that time, resonant inductive technology has become remarkably efficient with the ability to achieve system efficiencies above 80%, across mid-range distances or distances two, three, or even four times the coil diameters for high quality 'Q' coils or coils with high inductive reactance relative to their resistance. Today, coils can resonate at safe frequencies with the magnetic fields capable of traveling through solid objects, even human tissue, at International, Scientific, and Medical (ISM) bands, such as 6.78 MHz and 13.56 MHz, with Specific Absorption Rates (SAR) and electric fields lower than FCC regulations at power levels in even the kilowatt (kW) range. Yet, various implementations of resonant inductive technology tend to suffer from certain drawbacks, such as the difficulty charging multiple devices simultaneously and the undesired sensitivity to angular misalignment.

If the angle between the receiver device (e.g., the electronic device to be wirelessly charged) and the transmitter device (e.g., wireless charging product) is misaligned, the receiver device may not charge well, or more likely, not at all. Furthermore, resonant inductive technology has difficulty charging multiple devices simultaneously if the transmitter coil isn't much larger than the receiving coil(s).

Due to those and other technical issues in wireless charging, resonant inductive technology has been limited in terms of its practical applications to mainly inductive charging pads. For example, conventional inductive charging pads are thin matt-like objects that charge electronic devices when placed on the pad. These inductive charging pads are almost always completely reliant on an outlet with very limited charging distances, e.g., normally within the range of several centimeters. Moreover, inductive charging pads are usually off-resonant products because of the engineering challenges in constructing the impedance matching networks, which limits the charging distances for electronic devices from the pad to a maximum of approximately 5 cm due to the severe drop in system efficiency.

An engineering challenge exists in developing an impedance matching network that maximizes the power across the load, especially while the receiver(s) are in movement. One example of such challenges include minimization or elimination of charging disruptions or failure due to a change in the coupling coefficient between the transmitter and the receiver due to moving the angular position or distance of the receiver to the transmitter, e.g., such as the smartphone moving relative to the wireless charging product. Another example includes management of changes in the resistance of the load in the receiver, which can occur if a battery, e.g., such as the rechargeable lithium ion battery in a smartphone, is charged at a different capacity.

Inductive charging pads are moveable, but are not portable. In other words, they can be moved relatively easily from one place to another, but maintain the same application of charging an electronic device when it is within touching or very close proximity to the product on a limited angular plane. This makes the applications of inductive charging pads and resonant inductive technology in general quite limited and inconvenient, if not impractical.

An antenna is a single conductor or an array of conductors that is electrically connected in a transmitter or receiver device. In the transmitter device, the antenna radiates electromagnetic waves. In the receiver device, the antenna absorbs the electromagnetic waves from the transmitter device for the purpose of wireless communication or transferring wireless power. Three-dimensional antennas can be developed to increase the efficiency of the transmitter and receiver for wireless communication and wireless charging technologies. A three-dimensional antenna is an antenna with a conductor that has depth that may or may not be uniform due to angular windings and conductor spacing to improve the ratio of the energy stored versus energy dissipated or the quality (Q) of the antenna.

This patent document describes techniques that can be used for providing wireless power transmission for charging electronic devices, e.g., mobile communication devices (e.g., such as smartphones, tablets, smartglasses, smartwatches, etc.) and robotics (e.g., such as microbotics). In some aspects, embodiments of the disclosed technology includes resonant inductive wireless power systems to wirelessly charge one or more receiver devices by a transmitter device that is able to overcome severe angular misalignment between the transmitter and receiver devices. The disclosed technology is able to simultaneously charge multiple receiver devices in a stationary position or while moving in three-dimensional space.

This patent document further describes techniques that can be used for fabricating three-dimensional antennas for wireless communication and wireless power transfer. In one example implementation, double-injection molding electroplating may be used to accurately design, develop, and manufacture three-dimensional antennas with conductor depth, thin conductor requirements, and angular windings.

In some embodiments, for example, the resonant inductive wireless power systems of the present technology include a transmitter device that includes amplifier circuits to draw power from a Direct Current (DC) power source, e.g., such as a rechargeable battery, and deliver the power to resonating LC tanks structured to include specialized coils. The LC tanks of the transmitter device converts the electrical signal into electromagnetic waves, which are transmitted to corresponding resonant LC tank(s) in one or more receiver devices. The receiver(s) may then convert the Alternating Current (AC) to DC, e.g., through a bridge rectifier, if DC is desired in the application, such as delivering the DC power to an electronic device (e.g., a smartphone).

Implementations of the disclosed technology may be used for open and closed wireless charging systems. For example, in an "open" system, the receiver(s) can be stationary or move freely from the exterior of the transmitter within a defined radius from the transmitter while receiving power across the load(s). The charging radius varies according the construction and quality "Q" of the individual coils, the resonant frequencies, the supply, and the impedance matching networks. In a "closed" system, for example, the receiver(s) can be stationary or move freely within the interior of the transmitter while receiving power across the load(s). Generally, the difference between an "open" and "closed" system is in the construction of the transmitter coil array and receiver location.

Notably, "closed" systems are designed to draw power directly from an Alternating Current (AC) power source, an example system being a wirelessly powered microbotic system. In this case, the system may or may not require power gain before being delivered to the resonating LC tanks in the transmitter.

Section headings are used in the present document to improve readability and do not in any way limit the disclosed techniques and embodiments to the corresponding section. Accordingly, the methods and embodiments described in different sections can be combined with each other.

Example Wireless Charging Systems

FIG. 1 shows a block diagram of an example resonant inductive wireless power system 100 of the disclosed technology. The system 100 includes a wireless charging (transmitter) device 110 and an electronic (receiver) device 120. The receiver device 120 includes a receiver coil 122 electrically coupled to a circuit 126. In some implementations, for example, the circuit 126 includes a charging circuit (e.g., to store electrical energy, such as a battery) or a regulator circuit and/or a buck converter to directly power the device 120 based on the converted electromagnetic energy converted to electrical energy at the coil 122. In some implementations, for example, the receiver device 120 includes an AC/DC converter to convert the AC electrical energy produced at the coil 122 to DC electrical energy to supply the charging circuit or regulator circuit 126.

The transmitter device 110 includes a power source 114 electrically coupled to a three-dimensional phased coil array 112 of the present technology. The power source 114 can include an AC power source, e.g., such as an electrical outlet, or a DC power source, e.g., such as a battery. In implementations including a DC power source, for example, the transmitter device 110 includes a DC/AC Converter to convert the DC electrical energy to AC electrical energy provided at the three-dimensional phased coil array 112.

The three-dimensional phased transmitter coil array 112 is structured to include two or more rectangular, elliptical, circular, or surface spiral air or ferrite core coils constructed in a three-dimensional format. The three-dimensional phased transmitter coil array 112 can be constructed to form various geometric or shaped volumes, e.g., including rectangular or square volumes, spherical, elliptical or other curved volumes, spiral shaped volumes, or other shapes as desired. The three-dimensional phased transmitter coil array 112 can be structured to have the desired shape and volume to integrate into the shape of the overall transmitter device 110. For example, the structure of the three-dimensional phased transmitter coil array 112 allows the transmitter device 110 to compensate for a decrease in the electromagnetic induction of the receiver device or devices 120, e.g., due to a potential positioning shift by the transmitter and/or receiver(s) by sending electromagnetic fields from multiple angles on the x, y, and z-axis planes. During a wireless charging operation of the transmitter device 110, the three-dimensional phased transmitter coil array 112 can increase the angular flexibility of receiver device or devices 120 for a resonant inductive system. Because resonant inductive systems struggle to maintain efficient wireless power transfer as the angular alignment between the transmitter and the receiver becomes closer and closer to perpendicular, the three-dimensional phased transmitter coil array 112 allows the receiver device or devices 120 to maintain free 360-degree movement by having one or several of its transmitter coils strengthen the intensity and direction of the magnetic fields.

Wireless charging implementations according to the disclosed technology is comparable to beamforming, e.g., such as in radar. However, instead of controlling the transmission and reception directionality of radio signals, the disclosed wireless charging system technology controls the angle and strength of magnetic fields for a resonant inductive transmitter via the three-dimensional coils' phased angles and strength of the signal for each transmitter coil.

For example, in cases where a transmitter device uses a single rectangular, elliptical, circular, or surface spiral transmitter coil with an air or ferrite core, the direction of the magnetic field is either into or out of the coil depending on the flow of electrons. A receiving coil can be placed close enough to the transmitter coil so that the two coils begin to couple and the magnetic fields are induced upon the receiver. However, if the receiving coil approaches 90-degrees with respect to the positioning of the single transmitter coil, then the receiving coil does not couple well with the single transmitter coil because electromagnetic induction of the receiver is significantly reduced. Thus, there are "dead zones" or areas where the wireless power transfer process is greatly inhibited due to the angular positioning of the receiver relative to the transmitter, especially if the transmitter remains stationary while the receiver moves its angular positioning.

The three-dimensional phased transmitter coil array of the disclosed technology provides at least one of its coils to compensate for a potential angular alignment shift between the transmitter and the receiver, preventing potential "dead zones" due to transmitter and/or receiver positioning.

Figure 2:
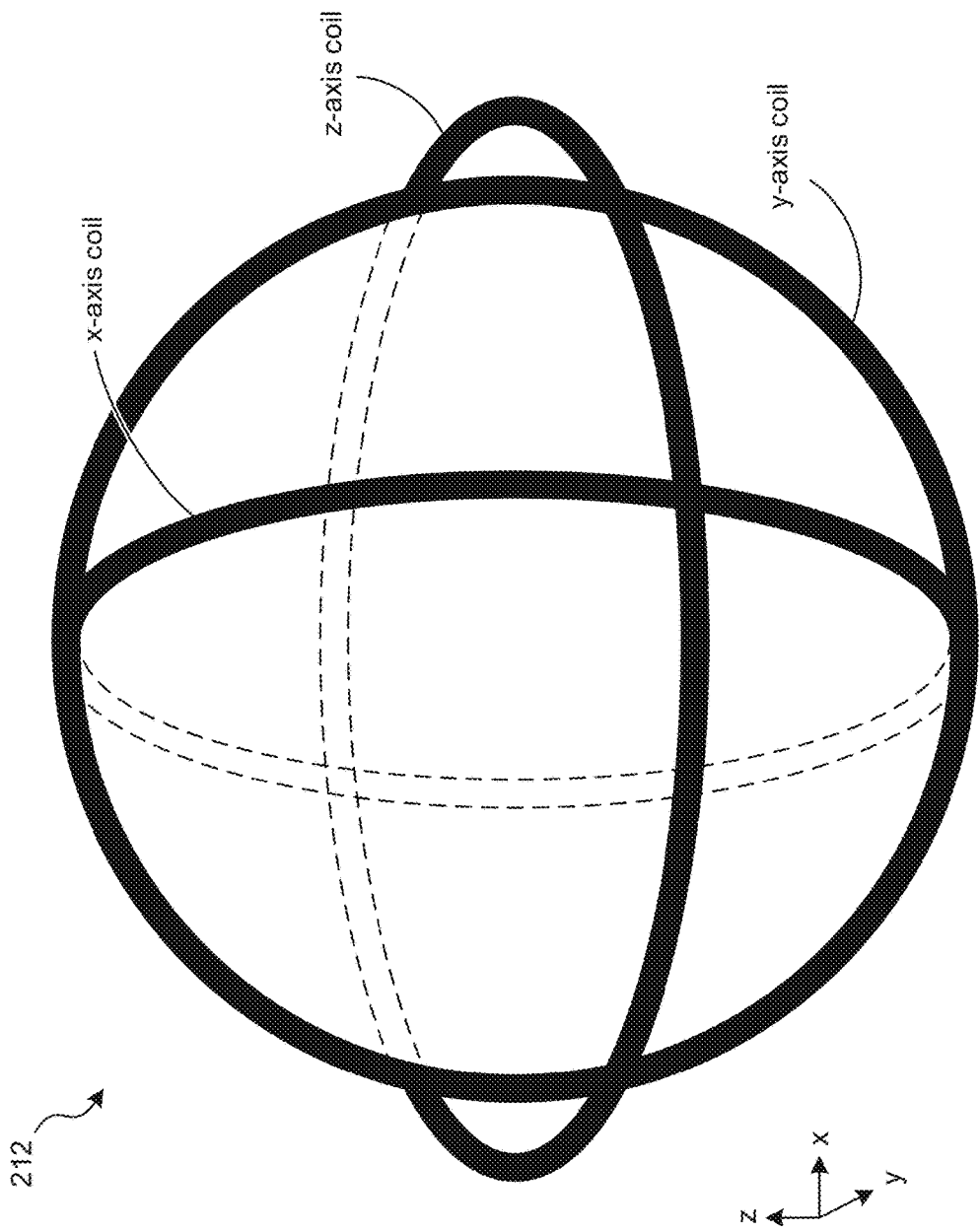
FIG. 2 shows a diagram of an example three-dimensional transmitter coil array of the present technology.

In embodiments of the system 100 for an "open" system implementation, for example, the three-dimensional coil array 112 is structured such that each successive coil is constructed inside the other. An example of this is shown in FIG. 2 where a three-dimensional transmitter coil array 212 includes three circular coils 90 degrees out-of-phase to one another on the x, y, and z-axis planes: the x-axis coil, the y-axis coil, and the z-axis coil. The three circular air-core coils of the transmitter coil array 212, as shown in FIG. 2, are arranged perpendicular to one another on the x, y, and z axis planes. In some embodiments, for example, the number of coils in the array as well as their angular positioning to one another can alter in order to maximize the electromagnetic induction of the receiver as its angular position changes relative to the transmitter.

In embodiments of the system 100 for a "closed" system implementation, for example, the three-dimensional coil array 112 is constructed into the interior of the wireless charging product or transmitter device 110 to maximize the electromagnetic induction of the receiver device(s) 120 whether moving or stationary throughout the interior of the structure. The three-dimensional transmitter coil array 112 is configured such that the surface area of the transmitter device 110 is covered with transmitter coils of the array 112 or positioned in a three-dimensional manner that maximizes the electromagnetic induction of the receiver(s) for a desired portion of the transmitter. For example, the shapes, positioning, and number of coils in the structure may alter depending on what areas throughout the product need to compensate for the angular and positioning shift(s) of the receiver(s).

Figure 3:
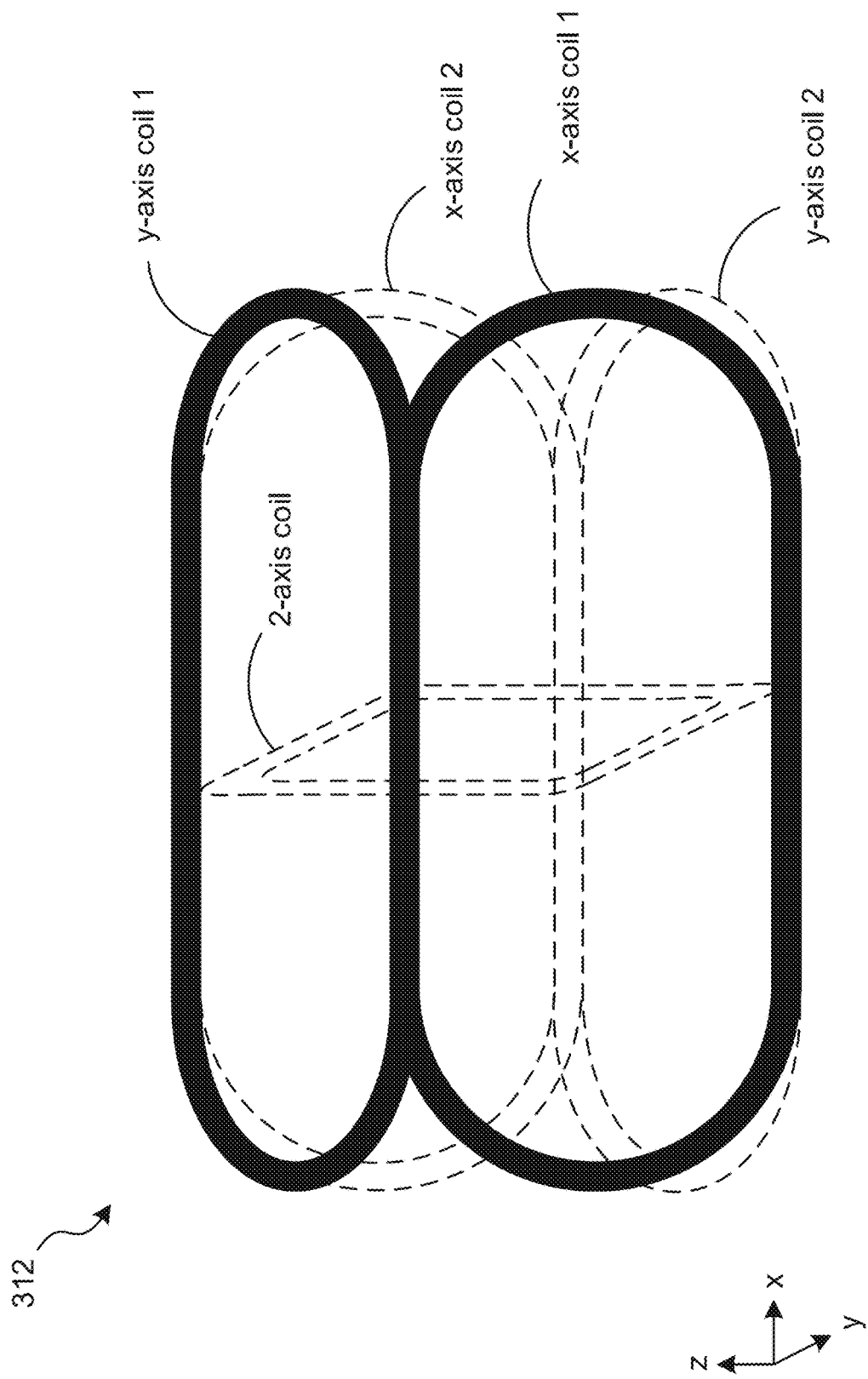
FIG. 3 shows a diagram of another example transmitter coil array of the present technology.

An example of a "closed" system configuration of the three-dimensional transmitter coil array 112 is shown in FIG. 3, which shows a diagram of a five-coil three-dimensional transmitter coil array 312 that includes five elliptical air-core coils positioned and arranged about each other on the x, y, and z axis planes. The coil array 312 is structured such that a first elliptical air core coil is arranged at a top region of the array about the y-axis plane (shown as y-axis coil 1 in FIG. 3), and a second elliptical air core coil is arranged at a bottom region of the array about the y-axis plane, parallel with the top region coil (shown as y-axis coil 2 in FIG. 3). A third elliptical air core coil is arranged at a first side region of the array about the x-axis plane (shown as x-axis coil 1 in FIG. 3), and a fourth elliptical air core coil is arranged at a second side region of the array about the x-axis plane, parallel with the first side region coil (shown as x-axis coil 2 in FIG. 3). A fifth elliptical air core coil is arranged such that it extends horizontally across the coil array 312, perpendicular to the first and second coils and to the third and fourth coils (shown as 2-axes coil in FIG. 3).

In an example application of this embodiment, the five elliptical transmitter coil array 312 can be configured in a transmitter device 110 in the interior of an automobile, plane, train or other vehicle so that the receiver device or devices 120, e.g., such as the driver's or passenger's smartphones, can freely move throughout the vehicle while efficiently charging the device, thereby leveraging the resonant inductive wireless charging system of the present technology. For example, the five elliptical transmitter coil array 312 can be configured in the vehicle such that the first elliptical air core coil is arranged the roof of the vehicle that spans in diameter from the front to the back seats, the second elliptical air core coil is arranged in the floor of the vehicle extending approximately the same distance in diameter, the third elliptical air core coil is arranged such that it spans from the right-hand side of double doors and the fourth elliptical air core coil is arranged such that it spans approximately the same distance on the left-hand side, and the fifth elliptical air core coil is arranged such that it extends horizontally across the vehicle, perpendicular to the roof and floor coils (e.g., positioned between the front doors and back doors).

Figure 4:
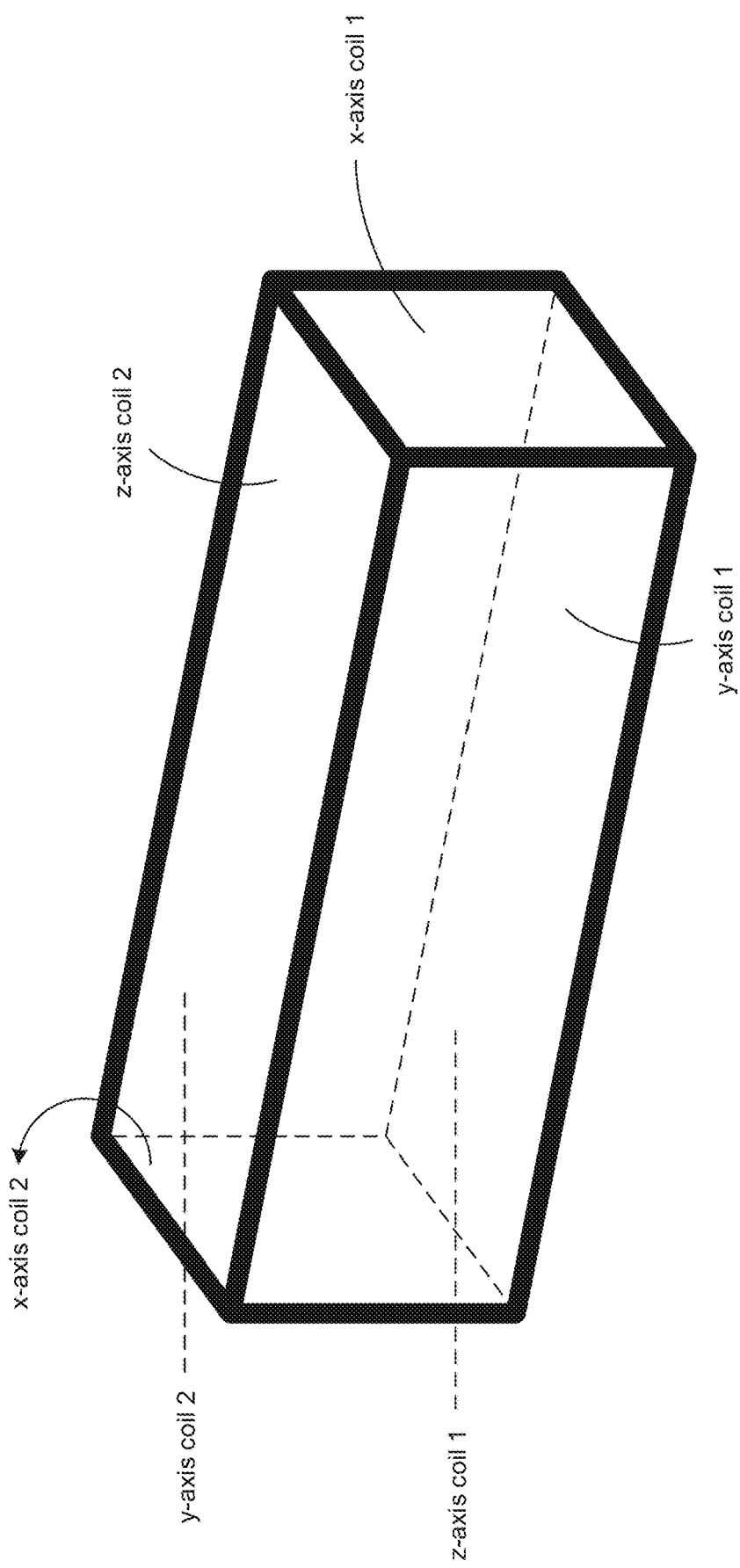
FIG. 4 shows a diagram of another example transmitter coil array of the present technology.

In another implementation of the system 100, another example can include a rectangular microbotic wireless charging system with rectangular air core coils built into all six sides of the transmitter device 110, which would allow the microbots to be wirelessly charged throughout every section of the structure even as they move on a three-dimensional plane. FIG. 4 shows another example of a "closed" system configuration of the three-dimensional transmitter coil array 112, which shows a diagram of a six-coil three-dimensional transmitter coil array 412 that includes six rectangular air-core coils positioned and arranged about each other on the x, y, and z axis planes. The coil array 412 is structured such that a first rectangular air core coil is arranged at a top region of the array about the z-axis (or x-y) plane (shown as z-axis coil 2 in FIG. 4), and a second rectangular air core coil is arranged at a bottom region of the array about the z-axis plane, parallel with the top region coil (shown as z-axis coil 1 in FIG. 4). A third rectangular air core coil is arranged at a first side region of the array about the y-axis (or x-z) plane (shown as y-axis coil 1 in FIG. 4), and a fourth rectangular air core coil is arranged at a second side region of the array about the y-axis plane, parallel with the first side region coil (shown as y-axis coil 2 in FIG. 4). A fifth rectangular air core coil at a third side region that is arranged horizontally at the intersections of the first, second, third, and fourth rectangular coils about the x-axis (or y-z) plane, and is perpendicular to the first, second, third, and fourth coils (shown as x-axis coil 1 in FIG. 4). A sixth rectangular air core coil at a fourth side region that is arranged horizontally at the intersections of the first, second, third, and fourth rectangular coils about the x-axis plane on the opposing side of the array 412 with respect to the third side (shown as x-axis coil 2 in FIG. 4).

In an example application of this embodiment, the six rectangular transmitter coil array 412 can be configured in a transmitter device 110 to wirelessly charge microbots. If microbots are able to leverage a resonant inductive charging platform while in motion, then the underlying functionality of them could greatly expand. For instance, by not having to store significant power in each microbot through constant wireless charging, they could maintain very small size and simultaneously be able to build or compile themselves into reusable three-dimensional structures inside the transmitter in a manner similar to a three-dimensional printer, but with the ability to not only accurately simulate size, but also weight and multi-colored structures, which can be a more accurate and reusable form of prototyping. This example of a "closed" system embodiment of the present technology also maintains coils on the x, y, and z-axis planes, but with different placement and positioning due to the receiver devices (e.g., microbots) being located inside the transmitter device 110 during the wireless charging rather than on the outside of the system as in an "open" system.

Figure 5A:
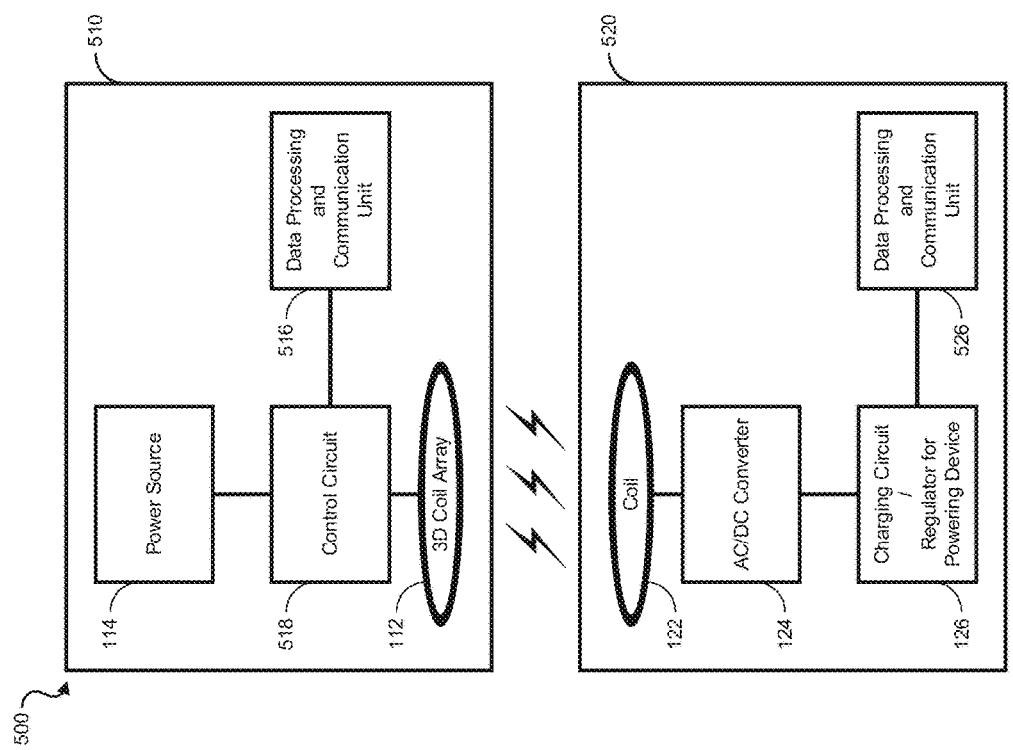
FIG. 5A shows a block diagram of another example resonant inductive wireless power system of the disclosed technology.

FIG. 5A shows a block diagram of another example resonant inductive wireless power system 500 of the disclosed technology. The system 500 includes a wireless charging (transmitter) device 510 and an electronic (receiver) device 520 that are configured like the transmitter device 110 and the receiver device 120, respectively, and additionally include a data processing and communication unit. The receiver device 520 includes a data processing and communication device 526 in communication with the circuit 126. The transmitter device 510 includes a data processing and communication unit 516 in communication with a control circuit 518 to control the electrical power supplied from the power supply 114 to the three-dimensional phased transmitter coil array 112. The control circuit 518 can also control the operational frequency and/or matching network of the transmitter device 510 as power is delivered to the three-dimensional phased transmitter coil array 112.

Figure 5B:
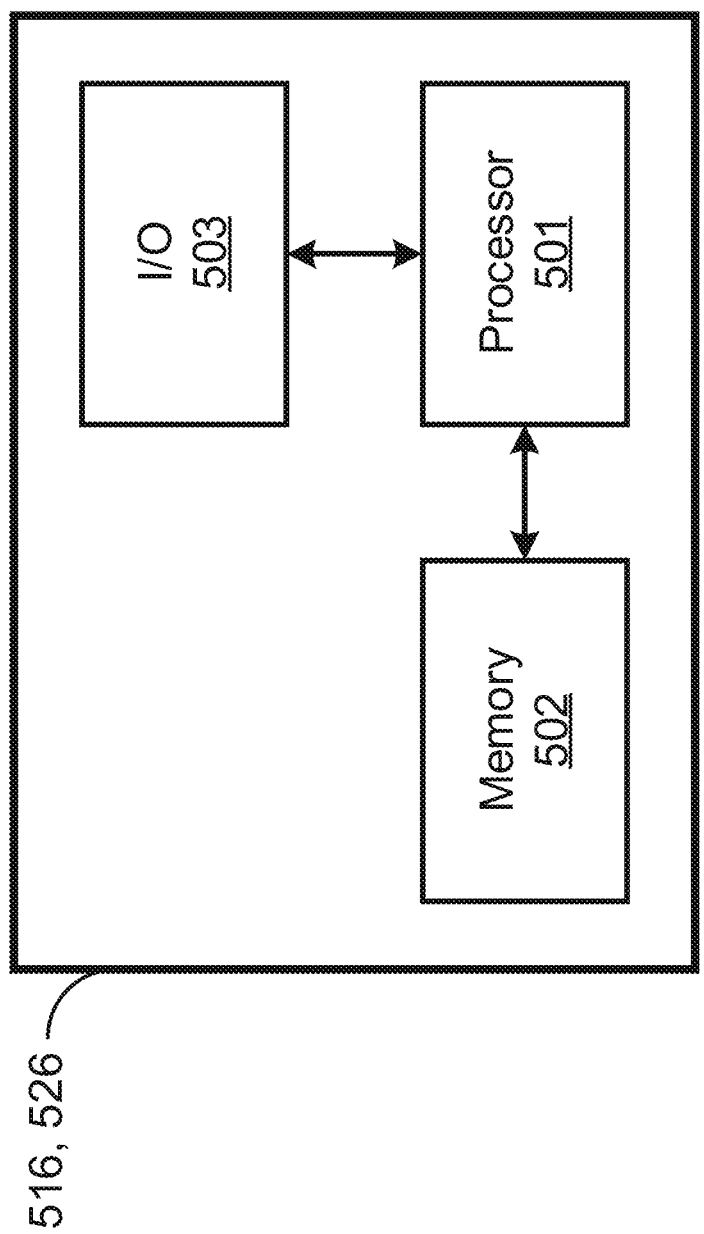
FIG. 5B shows a block diagram of an example data processing and communications unit.

An example embodiment of data processing and communications unit 516 and/or 526 is shown in FIG. 5B. The data processing and communications unit 516, 526 includes a processor 501 (e.g., such as a central processing unit (CPU) or microcontroller) to process data and a memory 502 in communication with the processor 501 to store and/or buffer data. The data processing and communications unit 516, 526 includes an input/output (I/O) unit 503 in communication with the processor 501 that provides wired and/or wireless interfaces (also referred to as communication interfaces) compatible with typical data communication standards for communication of the computer with other computers and computer systems, or external interfaces, sources of data storage, or display devices, among others. For example, the memory 502 can include processor-executable code, which when executed by the processor 501, configures the data processing and communications unit 516, 526 to perform various operations, such as receiving information, commands, and/or data, processing information and data, and transmitting or providing information/data to another entity or to a user. For example, the I/O unit 503 can include a transceiver to provide wired or wireless communications using one or more of the following standard communications interfaces, e.g., including, but not limited to, Universal Serial Bus (USB), IEEE 1394 (Firewire), Bluetooth, Bluetooth Low Energy (BLE), ZigBee, IEEE 802.11 (Wi-Fi), Wireless Local Area Network (WLAN), Wireless Personal Area Network (WPAN), Wireless Wide Area Network (WWAN0, WiMAX, IEEE 802.16 (Worldwide Interoperability for Microwave Access (WiMAX)), 3G/4G/5G/LTE cellular communication methods, and parallel interfaces, among others.

In some implementations of the "open" or "closed" systems, for example, the number of receivers that operate simultaneously may be limited in order to preserve potentially limited battery capacity of the transmitter device 110. For example, in a portable wireless charging product with the "open" system transmitter that includes a battery or otherwise not connected to an AC source (e.g., such as a wall outlet), then the source is limited to the current capacity of the rechargeable battery built into the transmitter. Because of this, it may be more desirable to charge a single device or a limited number of devices quicker and more effectively rather than more devices slowly. Using a communication interface, e.g., such as Bluetooth Low Energy (BLE), a user can control what devices charge and when through a user interface, e.g., such as a mobile application, which informs the transmitter via Bluetooth what receivers to focus on or matching network(s) to maximize.

In some implementations, for example, an open circuit can be created through a mechanical or electrical switch (of the control circuit 518), such as NPN transistors, controlled by the processor 501 (e.g., a microcontroller), for those receivers in the vicinity of the transmitter that the user prefers not to charge so that the reflected impedance is not accidentally altered in a manner that influences a change in the impedance matching network.

For example applications, such as automotive wireless charging systems, the manufacturers of electric vehicles may be more inclined to place a limit on the amount of power the wireless charging system can use in order to preserve battery capacity for other functions. For example, there may be an implicit limitation on how many and what kind of devices can operate simultaneously, making the option of creating open circuit for a limited number of receivers a necessity rather than a consumer preference. Also, for an "open" system, it may be possible that a matching network cannot be optimized that meets a minimum level of operational efficiency for multiple receivers. As stated previously, resonant inductive technology can struggle to charge multiple devices simultaneously if the transmitter coils are not significantly larger than the receiving coils. If a matching network cannot be optimized for effective energy transfer of multiple receivers in the charging radius of an "open" system due to their positioning to the transmitter, for example, then the ability to limit the number of receivers in the area of the transmitter may be essential for its operation.

An "open" system may increase the output power and charging radius of the transmitter when attached to a wall outlet or a source with greater power levels than the power of its built-in DC source. For example, in some implementations of the disclosed technology, an "open" system can be designed to be capable of wirelessly recharging via radio frequency (RF) harvesting and/or resonant inductive charging where the "open" wireless charging product acts as a receiver to another wireless charging platform, e.g., such as a custom designed inductive charging pad for the product or resonant inductive bicycle systems. In an example, a resonant inductive bicycle system can include a generator attached to a bicycle that converts the mechanical energy of the user riding the bike to electrical energy that may be further amplified before being delivered to resonating LC tanks that convert the electrical energy to electromagnetic waves. This is then sent to corresponding LC tanks in the "open" wireless charging product, e.g., such as a portable wireless charging system, to recharge its DC power source. Because the base of a user's backpack may be very close to the back seat of a bicycle, a resonant inductive bicycle product can be attached to the back wheel and recharge, for instance, a portable wireless charging platform in the user's backpack, which then recharges the user's devices as they move freely by leveraging its three-dimensional phased coil array. To summarize, an "open" system functions in a comparable manner to a router but instead of sending out data it sends out power, and can be designed to increase the radius of the router as well as charged by multiple modems that are designed for it.

In some implementations for an "open" system, the packaging design of the transmitter device (e.g., device 110 or 510) is an important consideration for implementation of portable resonant inductive charging processes, where the transmitter device includes the three-dimensional coil array, a DC power source, and printed circuit board(s) (PCBs). For example, because the diameter of coils are highly correlated with the charging distances achieved for a resonant inductive system, the coils of a portable wireless charging platform can be configured to be large enough for the electromagnetic fields to reach a receiver for meaningful distances between the transmitter and receiver. Furthermore, in order to achieve angular flexibility for the receiver, the transmitter coils can be positioned in a three-dimensional architecture, according to the disclosed technology. However, the arrangement of transmitter components (e.g., power source and/or converter, control circuit including PCB, etc.) within the overall transmitter device, as well as the form factor of the transmitter device, can affect the efficacy and efficiency of the resonant inductive coupling by the receiver device. The exemplary three-dimensional coil array configurations of the present technology allows for the placement of the remaining transmitter components (e.g., power source and/or converter, control circuit including PCB, etc.) in configurations inside or partially inside the three-dimensional coil array to achieve portability of the transmitter device.

For example, if a high power density rechargeable battery is placed adjacent to the coil array, then the transmitter device product may become significantly larger in size as well as potentially different and/or stricter in shape. For a portable wireless charging system, minimizing the dimensions of the product is an important consideration for its desired applications. For instance, if the transmitter is too large to be placed in a briefcase, book bag, pocketbook, or other place of storage and use in portable applications, then the intended applications and usage of the wireless charging product may become diminished.

Figure 6:
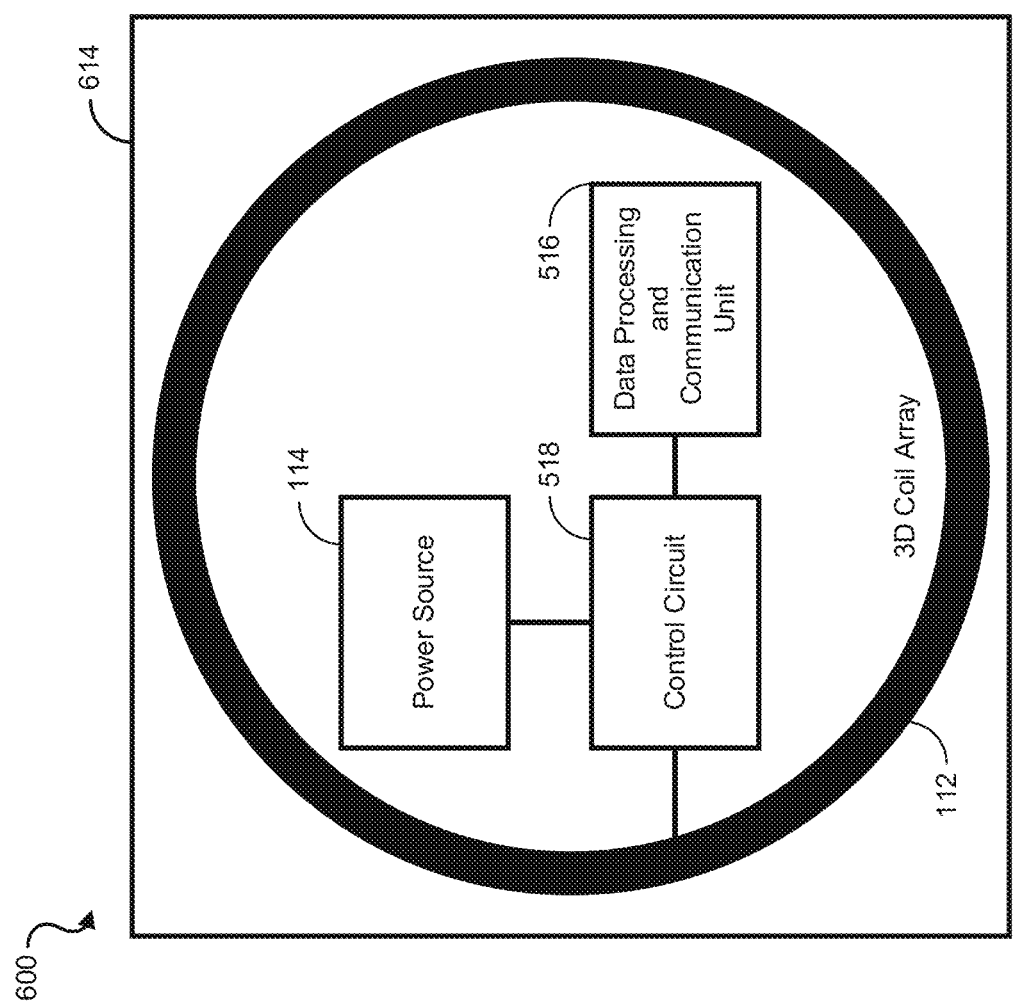
FIG. 6 shows a block diagram of an example of a portable wireless charging transmitter device of the disclosed technology.

FIG. 6 shows a block diagram of an example of a portable wireless charging transmitter device 600 of the disclosed technology. The transmitter device 600 includes a housing 614 that contains the three-dimensional phased transmitter coil array 112, which encompasses or at least partially encompasses the power source 114, the data processing and communication unit 516, and the control circuit 518. In this example embodiment, the transmitter components are placed inside the coil architecture to minimize the product dimensions. In such embodiments, this allows the three-dimensional coil array to be the key determinant in the product's size. Meanwhile, for a "closed" system, it may be advantageous that the coil array and PCBs to be manufactured directly into the interior of the transmitter device. With respect to the packaging design of the transmitter device for a "closed" system, it is not essential for the transmitter components to be arranged within the coil array in the interior of the transmitter device.

Some features of the disclosed technology may include one or more of the following, as an example. The system 100 may have separate driving and resonating coils for each coil in the array 112. The receiver device 120 may include a singular resonating coil or an array of coils, e.g., such as the coil array 112. The receiver device 120 may include two or three-dimensional coil structures to further increase angular flexibility depending on the application, e.g., such as three-dimensional loop coils or perpendicularly placed dipole coils. The transmitter device 110 may have a coil array with different resonating frequencies for the individual coils, and the receiver device 120 may have a coil array with corresponding resonant frequencies.

For an "open" system, for example, the transmitter device 110 can have a single rectangular, elliptical, circular, or surface spiral air or ferrite coil with actuators and/or other motors that move the single coil on a three dimensional plane as a substitute to the three-dimensional coil array.

In some implementations, the transmitter device 110 may have separate systems that control the supply for the coil array 112 and the alterations in the impedance matching networks, e.g., such as various wireless communication interfaces, such as Bluetooth Low Energy, informing the transmitter of changes in the positioning of the receiver by accessing a gyroscope and accelerometer, and changing the impedance matching network for these coils through a power sniffer, such as a directional coupler.

Figure 7:
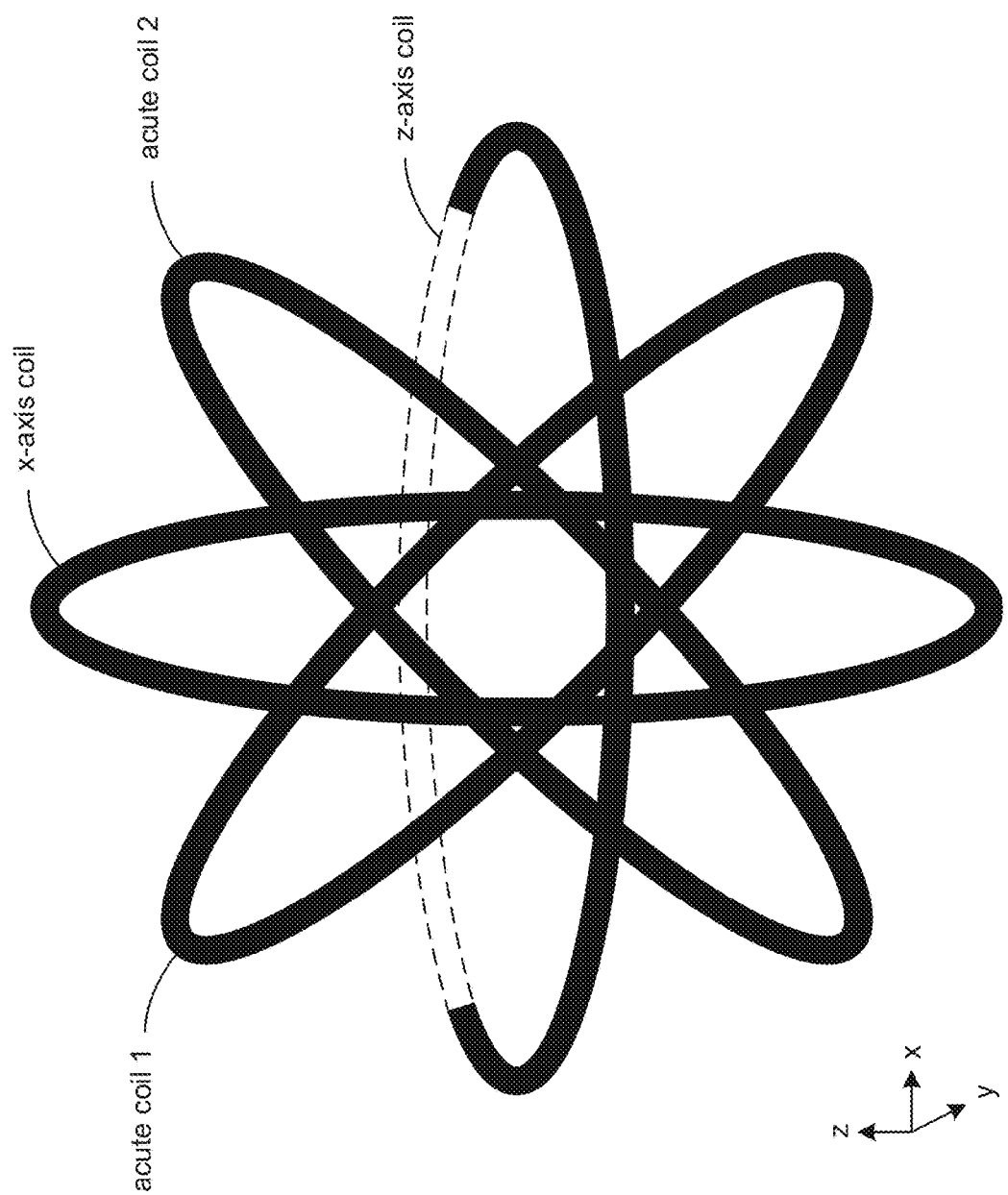
FIG. 7 shows a diagram of another example transmitter coil array of the present technology.

In some embodiments of the present technology, the configuration of the coils in the three dimensional phased coil array can be arranged at acute angles with respect to each other. In some embodiments, for example, some coils may be perpendicular to one another while others have acute angular alignments. FIG. 7 shows a diagram of an example three dimensional phased coil array 700 of the present technology including four circular air core coils aligned about each other at acute and perpendicular angles and intersecting one another. The coil array 700 includes a first coil shown in the diagram to be arranged on the y-z plane (referred to as the x-axis coil), and a second coil shown to be arranged on the x-y plane (referred to as the z-axis coil). The first and second coils are arranged to be perpendicular to each other. The coil array 700 includes a third coil, referred to as the acute coil 1 in the diagram, arranged at an acute angle with respect to the x-axis coil and the z-axis coil. The coil array 700 includes a fourth coil, referred to as the acute coil 2, arranged with respect to the x-axis coil and the z-axis coil. The acute coil 1 and the acute coil 2 may be arranged to have an acute angular alignment or a perpendicular alignment with respect to each other. The coil array 700 may include additional coils to affect the direction of the transmitted electromagnetic field to the receiver coil for resonant inductive coupling to wirelessly charge the receiving device from the transmitter device. In some implementations, for example, the coil array 700 may be implemented in an "open" system transmitter device.

Exemplary Applications of the Disclosed Technology

The global battery charger market is estimated to be approximately twelve billion dollars, and is mainly driven by the wireless charging segment. This sector encompasses all solutions that intend to wirelessly recharge electronics, such as smartphones and tablets, and is currently approximately two billion dollars, with an expectation to grow to about seven billion dollars in the coming years.

Currently, the market is well divided because many disagree on what circuits maintain the most efficient and convenient charge. The two predominant standards are currently referred to as 'Qi' and 'A4WP', and have the market split in a manner that is reminiscent of the VHS and Betamax wars of the past. The main issue is that each standard uses different frequencies and integrated circuits (ICs), which cause incompatibility when one standard's receiver is used with another standard's product. Although some believe that the two standards will eventually merge, if one standard beats out another, there will be many companies that will struggle to adopt the other standard due to many products being highly tuned to a standard's frequency. Thus, even choosing a standard, if any, before building a new wireless charging product is a struggle in itself, and has kept the market sharply divided with many consumer electronics manufacturers reluctant to commit to a specific standard.

Existing inductive charging pad devices are typically thin pad-like objects that charge smartphones, and sometimes tablets, by simply having an electronic device on the pad. Inductive charging pad device are envisioned to be popular products that could be ubiquitously found in places like restaurants to airports. Notably, however, these existing devices cannot effectively or efficiently charge multiple devices, suffer from overheating issues, not independent (e.g., almost all rely completely on an outlet, and are therefore not portable), provide inflexible positioning of the electronic device to be charged, and fail to provide wireless user control or customization.

The disclosed technology provides wireless power transmission for charging electronic devices, e.g., such as smartphones, and robotics, such as microbotics, that can wirelessly charge one or more receiver devices by a transmitter device of the disclosed technology including a three-dimensional phased coil array. The disclosed transmitter devices are able to wirelessly charge the receiving device or devices in a manner that is able to overcome severe angular misalignment between the transmitter and receiver devices, and charge multiple receiver devices simultaneously whether in a stationary position or while moving in three-dimensional space.

EXAMPLES

The following examples are illustrative of several embodiments of the present technology. Other exemplary embodiments of the present technology may be presented prior to the following listed examples, or after the following listed examples.

In an example of the present technology (example 1), a wireless power system includes a wireless charging transmitter device including a power source electrically coupled to a three-dimensional coil array structured to include two or more coils to produce an electromagnetic field that emanates from the three-dimensional coil array, in which the coils are arranged such that at least two coils are perpendicular to each other to direct the electromagnetic field to a charging area in which an electronic device can be wirelessly charged by including a receiver coil to receive the electromagnetic field from the three-dimensional coil array to charge or power the electronic device.

Example 2 includes the system of example 1, in which the coils of the three-dimensional coil array are structured to include rectangular, elliptical, circular, or surface spiral air or ferrite core coils.

Example 3 includes the system of example 1, in which the three-dimensional coil array is operable to direct the electromagnetic field into or out of a coil of the coil array based on a magnetic field produced depending on the flow of electrons through the coil.

Example 4 includes the system of example 1, in which the three-dimensional coil array is structured to include three circular coils arranged to be 90 degrees out-of-phase to one another on the x-axis plane, y-axis plane, and z-axis plane, respectively.

Example 5 includes the system of example 1, in which the three-dimensional coil array is structured to include five elliptical air core coils, including a first coil arranged at a top region of the coil array on the y-axis plane, a second coil arranged at a bottom region of the array on the y-axis plane and parallel with the first coil, a third coil arranged at a first side region of the array on the x-axis plane, a fourth coil arranged at a second side region of the array on the x-axis plane and in parallel with the third coil, in which the first and second coils are perpendicular to the third and fourth coils, and a fifth coil arranged such that it extends horizontally across the coil array and is perpendicular to the first, second, third, and fourth coils.

Example 6 includes the system of example 1, in which the three-dimensional coil array is structured to include six rectangular air core coils, including a first coil arranged at a top region of the array on the z-axis, a second coil is arranged at a bottom region of the on about the z-axis plane and in parallel with the first coil, a third coil arranged at a first side region of the array on the y-axis, a fourth coil arranged at a second side region of the array on the y-axis plane and in parallel with the third coil, a fifth coil at a third side region that is arranged horizontally at a first intersection of a portion of the first, second, third, and fourth coils and on the x-axis plane, and a sixth coil at a fourth side region on the x-axis plane that is arranged horizontally at a second intersection of another portion of the first, second, third, and fourth coils on the opposing side of the array with respect to the third side.

Example 7 includes the system of example 1, in which the transmitter device is operable to cause electromagnetic induction at the receiver coil during a positioning shift by the transmitter device or the receiver device by sending the electromagnetic field from multiple angles of the coils of the three-dimensional coil array.

Example 8 includes the system of example 1, in which the transmitter device is operable to cause electromagnetic induction at the receiver coil while allowing the receiver device to undergo free 360-degree movement by having one or more of the coils strengthen intensity and direction of magnetic fields.

Example 9 includes the system of example 1, in which the power source is an AC power source.

Example 10 includes the system of example 1, in which the power source is a DC power source, and the wireless charging transmitter device further includes a DC/AC converter to convert DC electrical energy to AC electrical energy that is provided to the three-dimensional coil array.

In an example of the present technology (example 11), a wireless charging transmitter device includes a power source; a three-dimensional coil array electrically coupled to the power source and structured to include two or more coils to produce an electromagnetic field that emanates from the three-dimensional coil array, in which the coils are arranged such that at least two coils are perpendicular to each other to direct the electromagnetic field, in which the wireless charging transmitter device is operable to wirelessly charge an electronic device by providing the electromagnetic field at a receiver coil of the electronic device to convert the electromagnetic energy to electrical energy to power the electronic device.

Example 12 includes the device of example 11, in which the coils of the three-dimensional coil array are structured to include rectangular, elliptical, circular, or surface spiral air or ferrite core coils.

Example 13 includes the device of example 11, in which the three-dimensional coil array is operable to direct the electromagnetic field into or out of a coil of the coil array based on a magnetic field produced depending on the flow of electrons through the coil.

Example 14 includes the device of example 11, in which the three-dimensional coil array is structured to include three circular coils arranged to be 90 degrees out-of-phase to one another on the x-axis plane, y-axis plane, and z-axis plane, respectively.

Example 15 includes the device of example 11, in which the three-dimensional coil array is structured to include five elliptical air core coils, including a first coil arranged at a top region of the coil array on the y-axis plane, a second coil arranged at a bottom region of the array on the y-axis plane and parallel with the first coil, a third coil arranged at a first side region of the array on the x-axis plane, a fourth coil arranged at a second side region of the array on the x-axis plane and in parallel with the third coil, in which the first and second coils are perpendicular to the third and fourth coils, and a fifth coil arranged such that it extends horizontally across the coil array and is perpendicular to the first, second, third, and fourth coils.

Example 16 includes the device of example 11, in which the three-dimensional coil array is structured to include six rectangular air core coils, including a first coil arranged at a top region of the array on the z-axis, a second coil is arranged at a bottom region of the on about the z-axis plane and in parallel with the first coil, a third coil arranged at a first side region of the array on the y-axis, a fourth coil arranged at a second side region of the array on the y-axis plane and in parallel with the third coil, a fifth coil at a third side region that is arranged horizontally at a first intersection of a portion of the first, second, third, and fourth coils and on the x-axis plane, and a sixth coil at a fourth side region on the x-axis plane that is arranged horizontally at a second intersection of another portion of the first, second, third, and fourth coils on the opposing side of the array with respect to the third side.

Example 17 includes the device of example 11, further comprising a circuit to control electrical power supplied from the power supply to the three-dimensional coil array.

Example 18 includes the device of example 17, wherein the control circuit is operable to control operational frequency or provide a matching network of the device as the electrical power is supplied to the three-dimensional coil array.

Example 19 includes the device of example 17, wherein the power supply and the circuit are placed within or at least partially within the three-dimensional coil array of the device.

In an example of the present technology (example 20), a wireless power system includes a wireless charging transmitter device including a power source electrically coupled to a three-dimensional coil array structured to include two or more coils to produce an electromagnetic field that emanates from the three-dimensional coil array, wherein the coils are arranged such that at least two coils are acute or perpendicular to each other to direct the electromagnetic field to a charging area in which an electronic device can be wirelessly charged by including a receiver coil to receive the electromagnetic field from the three-dimensional coil array to charge or power the electronic device.

Example 21 includes the system of example 20, wherein the coils of the three-dimensional coil array are structured to include rectangular, elliptical, circular, or surface spiral air or ferrite core coils.

Example 22 includes the system of example 20, wherein the three-dimensional coil array is operable to direct the electromagnetic field into or out of a coil of the coil array based on a magnetic field produced depending on the flow of electrons through the coil.

Example Fabrication Techniques

Various embodiments of a production process and a system are described for the development of three-dimensional antennas. Some embodiments include a double-injection molded plastic dielectric. The primary material is chosen to decrease losses and physically support the conductor of the antenna. The overmold material is chosen for facilitating electroplating and depositing the conductor onto the surface of the design. The double-injection mold includes a gate of at least 1 mm, preferably 2 mm in diameter. The gate is structured to have the three-dimensional antenna clamped and stable for the electroplating process. The double-injection mold is then electroplated such that the conductor has no discontinuities due to the gate or electroplating process to improve its performance, especially at radio frequencies (RF). In some implementations, additional spot electroplating may be performed after the gate is removed at the end of the fabrication process.

Antennas in products today are primarily planar. Planar antennas typically have planar dimensions that are suitable for the device in which they are installed. For example, some planar antennas may be 1 to 3 millimeters wide, and 1 to 5 millimeters long. Tablet computers that have larger sizes may have larger antennas, while IoT devices such as smartwatches and mobile devices may have antennas that measure in sub-centimeter dimensions. Typical thickness of such antennas may be 1 to 3 millimeters, hence the essentially planar look. Examples of planar antennas include a microstrip antenna, an air-core elliptical antenna, and a surface mount device (SMD) RF antenna. These antennas are typically designed, developed, and manufactured with planar manufacturing processes, such as PCB fabrication, NFC inlay production, or by wounding a wire around a fixed jig. However, these conventional techniques are not suitable for an antenna with depth (e.g., a three-dimensional antenna), offset air gaps, winding gaps, and angular windings. The challenge is especially notable for RF antennas that have specific design requirements to maintain optimal performance due to the proximity effect, skin effect, and capacitive parasitics that become more profound and influential at higher frequencies. Furthermore, RF antennas often have low tolerances for error in trace/wire spacing and conductor thickness, making the development accuracy more critical for effective prototyping and manufacturing. Laser Direct Structuring (LDS) is one possible manufacturing technique to build antenna components that have an objective to meet three-dimensional freedom. However, a three-dimensional antenna typically requires a large surface area of conductor deposition, making a process like LDS too expensive and time consuming to execute.

Electroplating is the process in which an electric current is used to form a metal coating on an electrode. An example and common process is copper electroplating for US pennies where the electrode is zinc and the metal coating on the electrode is copper. Electroplating is not often typically used for the development of antennas, but is sometimes used for antenna fabrication to physically deposit an antenna onto the contours of a non-planar surface, such as a planar antenna being electroplated onto the contours of a mobile device. This process allows a normally planar antenna to be placed into a device that is not completely planar. In contrast to the use of electroplating to make a planar antenna that is conformal to a three-dimensional device, the disclosed technology allows for operations by which a three-dimensional antenna can be effectively designed, developed, and manufactured. In some embodiments, as further disclosed in this document, a three-dimensional antenna may include multiple windings of conducting material that are all manufactured simultaneously using a double injection molding process. The antenna may subsequently be used for transmitting or receiving power in a formation that includes a single antenna or multiple antennas may be arranged in a three-dimensional coil array such as depicted in FIGS. 2 to 7.

Figure 19:
FIG. 19 shows an example of a three-dimensional industrial antenna.

For antennas, the dielectric constant and dissipation factor of the chosen materials are a critical decision for effective design, implementation, and production. The dielectric constant of a material is the material's ability to store electrical energy in an electric field, while the dissipation factor of the material is the ratio of the material's capacitive reactance to its resistance to measure its insulating inefficiency. A material that can be easily electroplated, such ABS plastic, can experience significant losses in performance, especially in an RF application, so it is not desirable to use ABS on its own in designing antennas. This is because while ABS plastic is a common material that can be electroplated, it is also a lossy material with a high dissipation factor and dielectric constant. For example, an example industrial antenna may be approximately 10 inches in diameter. One example is depicted in FIG. 19, which shows an example of a three-dimensional antenna 1900. The slot 1902, whose functionality is further described in the present document, is visible in this picture. While the exact values differ based on the specific plastic material, ABS plastic typically has a dielectric constant of approximately 4.0 and a dissipation factor of approximately 0.02, while polypropylene (PP) plastic typically has a dielectric constant of 2.2 and dissipation factor of approximately 0.0003. With PP plastic as the main dielectric, the example industrial antenna has a Q of approximately 1200. Meanwhile, with ABS plastic as the solid dielectric, the same antenna has a Q of approximately 900. Therefore, in this example, the ABS plastic as the selected dielectric material attributed to additional losses of approximately 25%. Furthermore, a single electroplated material, such as ABS plastic, may not be able to develop complex angular windings or air gaps of antennas with depth. The entire surface area exposed in the acid solution for electrodeposition will typically be electroplated, which may create a potential short circuit and compromising the antenna design and functionality.

A double-injection mold can be developed where the overmold material is one that can be easily electroplated, while the primary (base) material is one that has a low dielectric constant and dissipation factor to maintain high performance and structure integrity. The primary material should provide physical support for the overall structure because the electroplated metal will be very thin, typically between 10 um to 30 um for electrodeposition. Therefore, even a high cost production method, such as 3D metal printing would not be a feasible execution or testing process because the metal will not likely be thick or sturdy enough to support itself. For an antenna, the thickness of the conductor is an important design decision factor, especially for use at RF frequencies of 5 MHz and higher (up to tens of GHz). One reason is that, at higher frequencies, the skin effect or the tendency for a high-frequency alternating current to flow towards the outer layer of the conductor becomes more dominant. Therefore, while electrodeposition can be a good selection for the development of a conductor, it is normally not used for antennas because the antenna development process cannot be easily controlled with the entire surface area exposed in the acid solution being electroplated.

Figure 8:
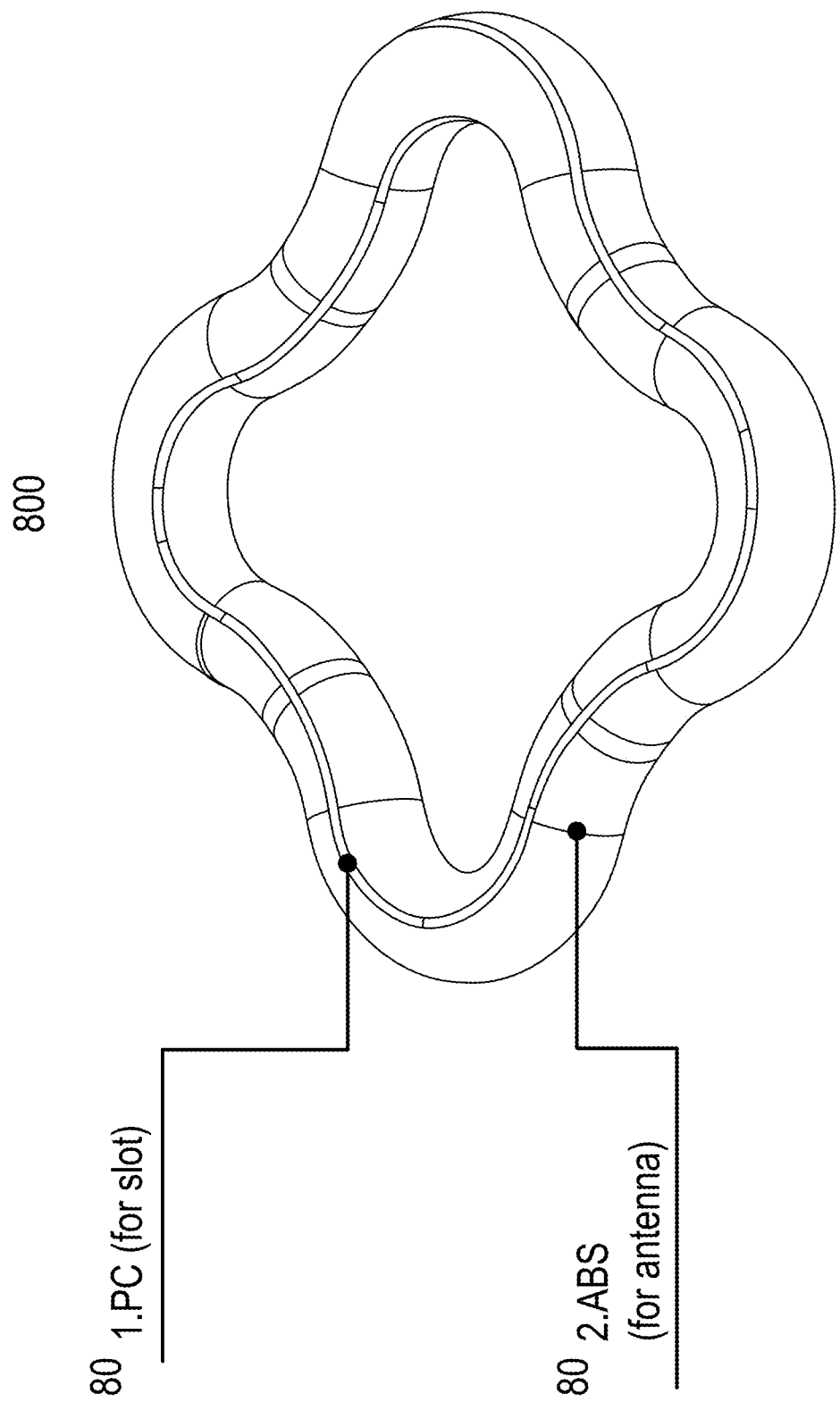
FIG. 8 shows an example of a double injection mold used for antenna fabrication.

FIG. 8 shows an example double injection molded dielectric for a three-dimensional antenna 800 where the overmold material 802 can be a commonly electroplated plastic, such as ABS plastic, while the primary material 801 can be a low dissipation factor and dielectric constant plastic, such as polycarbonate (PC) plastic. Alternatively, the primary material 801 may be high impact polystyrene (HIPS). Because HIPS cannot be easily electroplated while the ABS plastic can be, a three-dimensional antenna design can be implemented such that the overmold material 802 is the portion in which the antenna conductor will be deposited, while the primary material 801 plastic is the portion in which there is an intended air gap. Because the primary material 801 experiences very little losses, the overall losses for the antenna are greatly minimized, thereby improving operational efficiency of the antenna. In antenna fabrication using mold, primary material is typically the first material inserted and the primary material may form the majority of the antenna dielectric.

However, during manufacturing, the entire structure of a three-dimensional antenna is typically inserted in the acid solution, a mechanism should be provided to allow physical handling of the three-dimensional antenna for operations such as insertion, removal or rotation of the antenna. In some embodiments, a rigid structure, called a gate, is inserted to clamp the three-dimensional antenna and control the conductor electrodeposition process.

Figure 9:
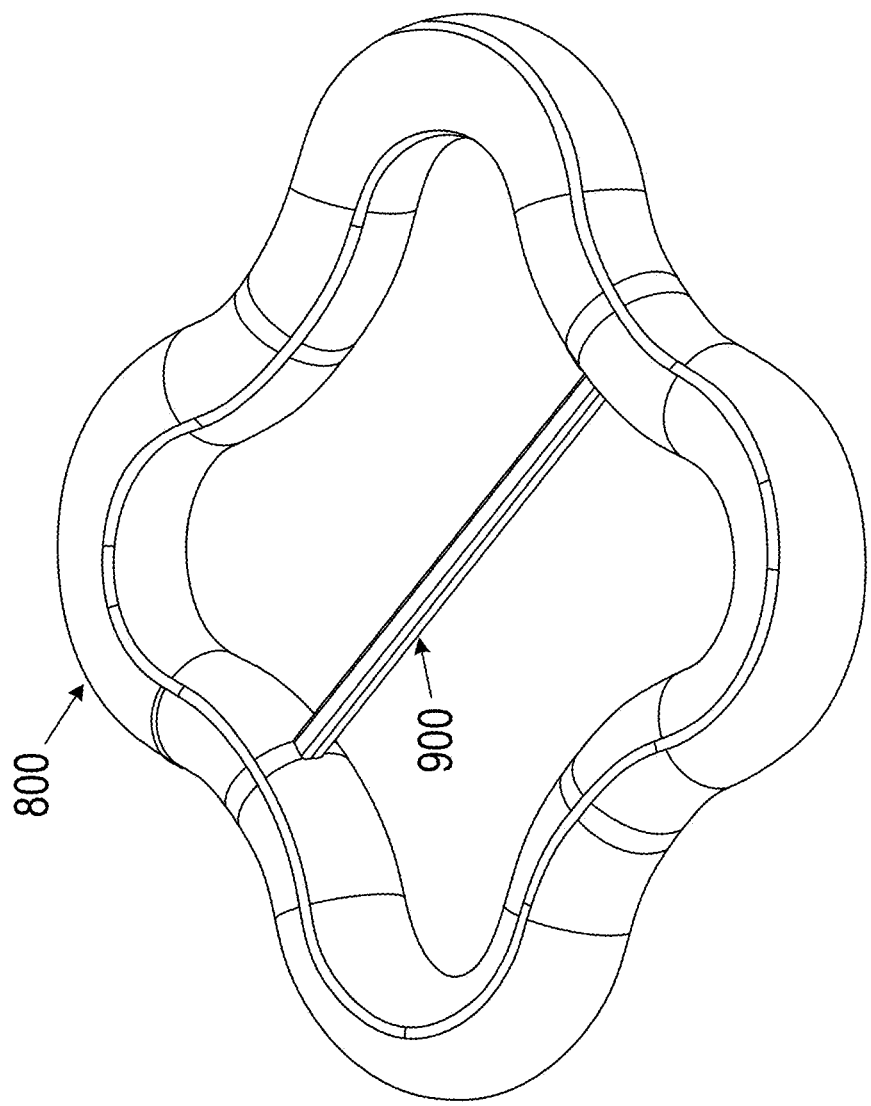
FIG. 9 shows an example arrangement of an injection mold and a gate used for fabrication of an antenna.

FIG. 9 shows an example gate insertion for a three-dimensional antenna. A gate 900 is inserted within the opening of the three-dimensional antenna 800 and makes secure contact at both ends of the gate 900 with the overmold material 802. In some embodiments, the gate 900 may be cylindrical, or rod-like in shape. The inner diameter of the cross-section of the gate 900 and the gate's placement on the antenna 800 are important for effective prototyping or production. The larger the inner diameter of the gate 900, the less of the conductor is deposited onto the surface area of the three-dimensional antenna 800 where the two ends of the gate 900 make the secure contact. At the same time, the inner diameter of the gate 900 cannot be made too small because the gate 900 should have a diameter wide enough to mechanically support the three-dimensional antenna 800 in the acid solution. The gate 900 cannot be too wide because it can then potentially compromise the intended antenna design or cause an open circuit on the path of the conductor. Accordingly, in some embodiments the gate 900 should be as small as possible and placed mostly on the primary plastic dielectric surface area where an air gap or electrodeposition is not intended. For example, the gate 900 may be placed touching the nearest facing inner surfaces of the three-dimensional antenna 800 (e.g., within ±10% of the smallest cross-sectional distance). The gate 900 may contact the antenna 800 at a cross-section that is about 25% or less than the height of the antenna 800.

In some embodiments, the electroplating liquid may seep into the intended gap of the dielectric (e.g., the slot or the groove) or not fully electroplate onto the overmold material. In other words, the electrodeposition of the conductor is uneven because the acid solution seeps between the overmold and primary materials. In this instance, a single material that can be electroplated, such as ABS plastic, can be injection molded with a groove that represents the slot or separating/spacing between the antenna windings. The groove can then be filled with a non-conductive substance, such as non-conductive glue, prior to electrodeposition so that the electroplated copper does not seep into the single material and create a short circuit. The resulting antenna is shown in FIG. 10A.

Figure 10A:
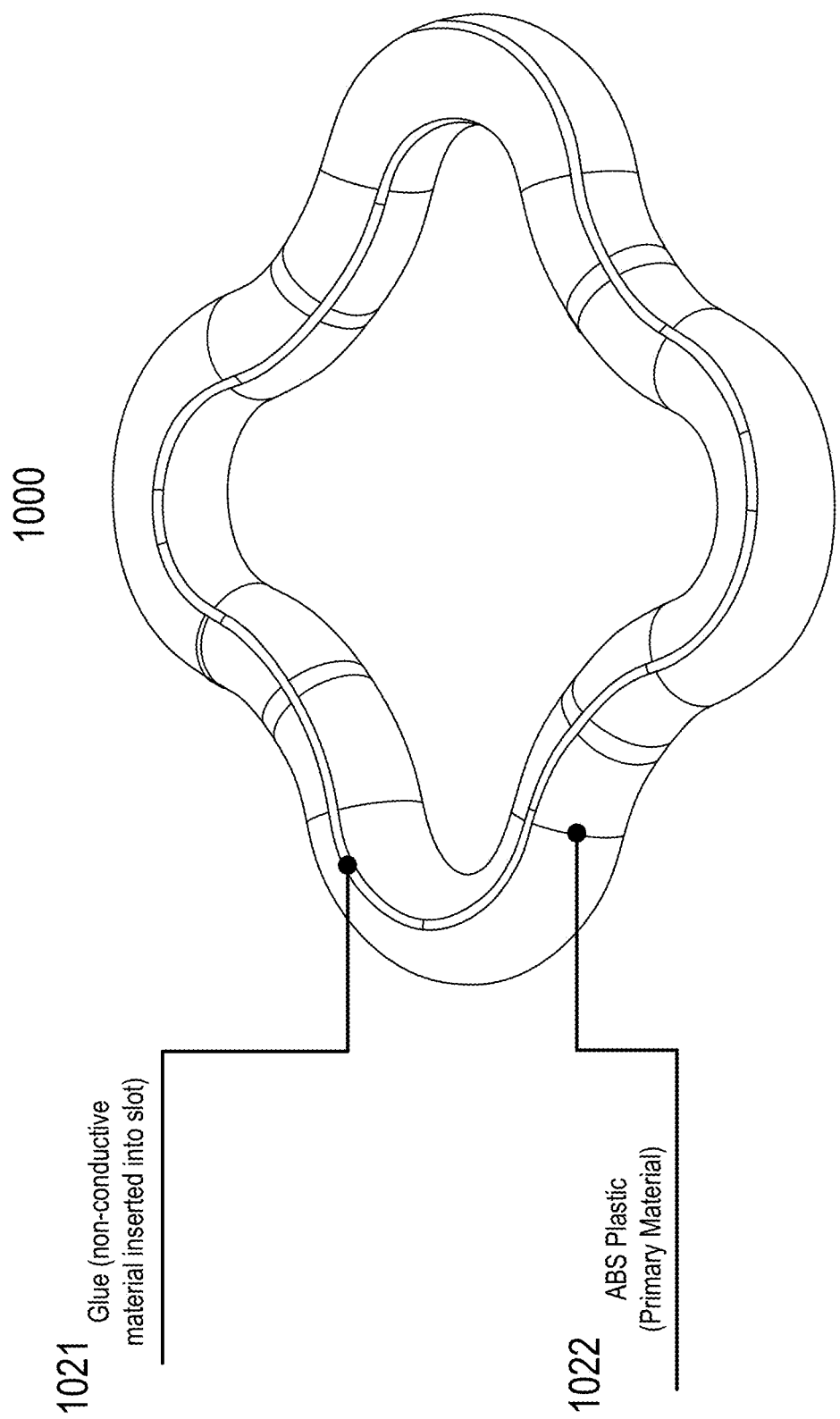
FIG. 10A shows an example of a single material injection mold used for antenna fabrication.

FIG. 10A shows an example antenna 1000 that was fabricated using techniques described in the present document. The primary material 1022 is ABS plastic. The primary material 1022 is designed to have a slot (or a groove) along its surface, which is filled with a non-conductive material such as glue 1021.

For example, the slot may have a rectangular or a triangular cross-section, as created by the tooling process that generates the slot. For example, width of the slot may be optimally selected to meet to conflict design considerations—(1) the width may be wide enough to create a robust electromagnetic separation between antenna windings (e.g., preventing electromagnetic cross-coupling), and (2) the width may be narrow enough that the surface of the conductive material is sufficient to produce the electromagnetic field for the wireless charging application. For example, the slot may be designed to have a size that is between 1 mm to 5 mm in width of the (e.g., the PC material for the slot 801 in FIG. 8 or the non-conductive glue 1021 in FIG. 10A)

Figure 10B:
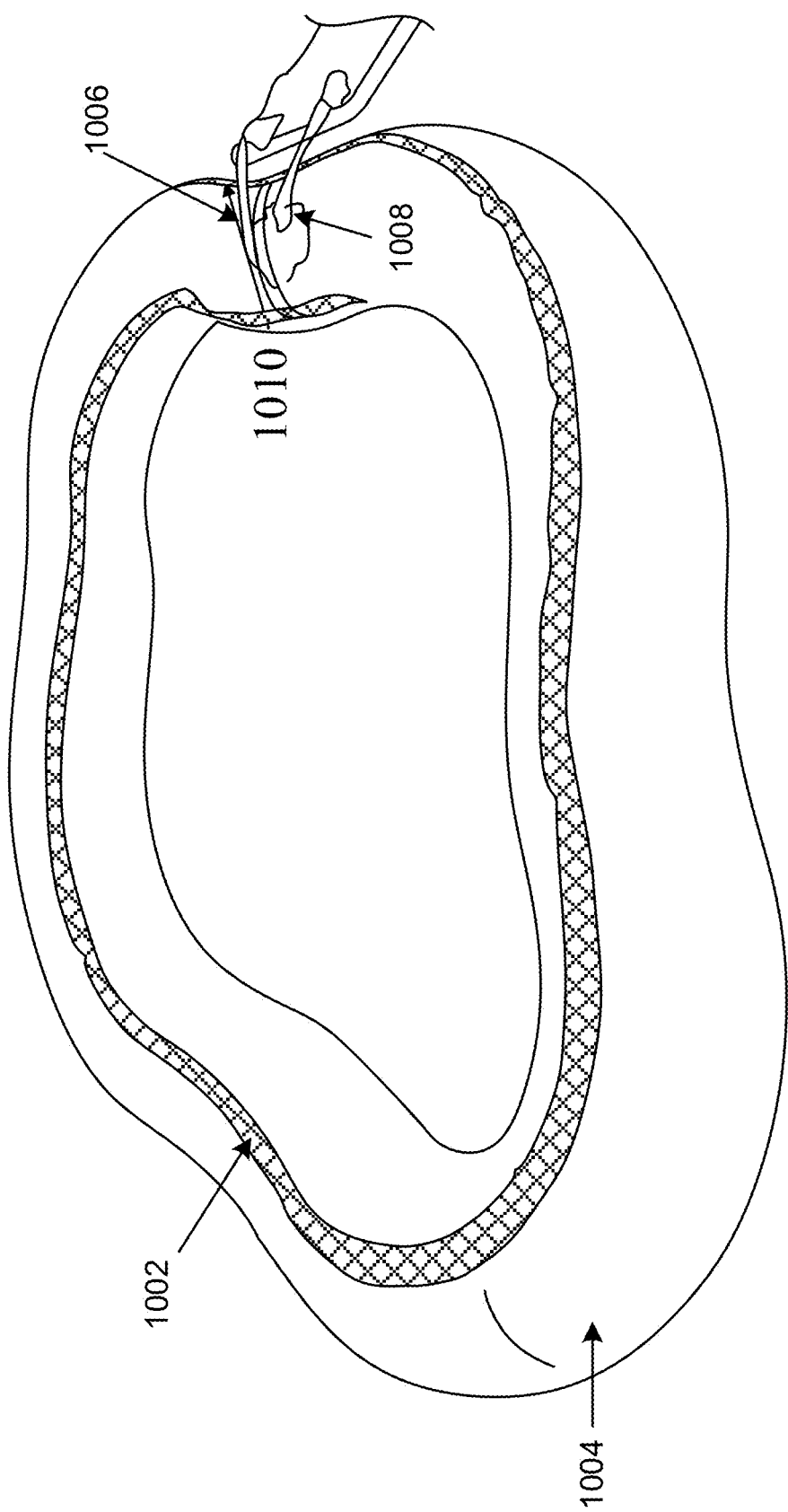
FIG. 10B shows an antenna including power and ground contact points.

FIG. 10B shows an example of a coil (antenna) after electroplating. The conductive material 1004 forms multiple loops around to body of the coil, with each loop electrically isolated from neighboring loops due to the slot 1002. The loops end on ground and power terminals 1006 and 1008 that are electrically separated by a gap 1010 along the direction orthogonal to the plane of winding of the loops.

Figure 11:
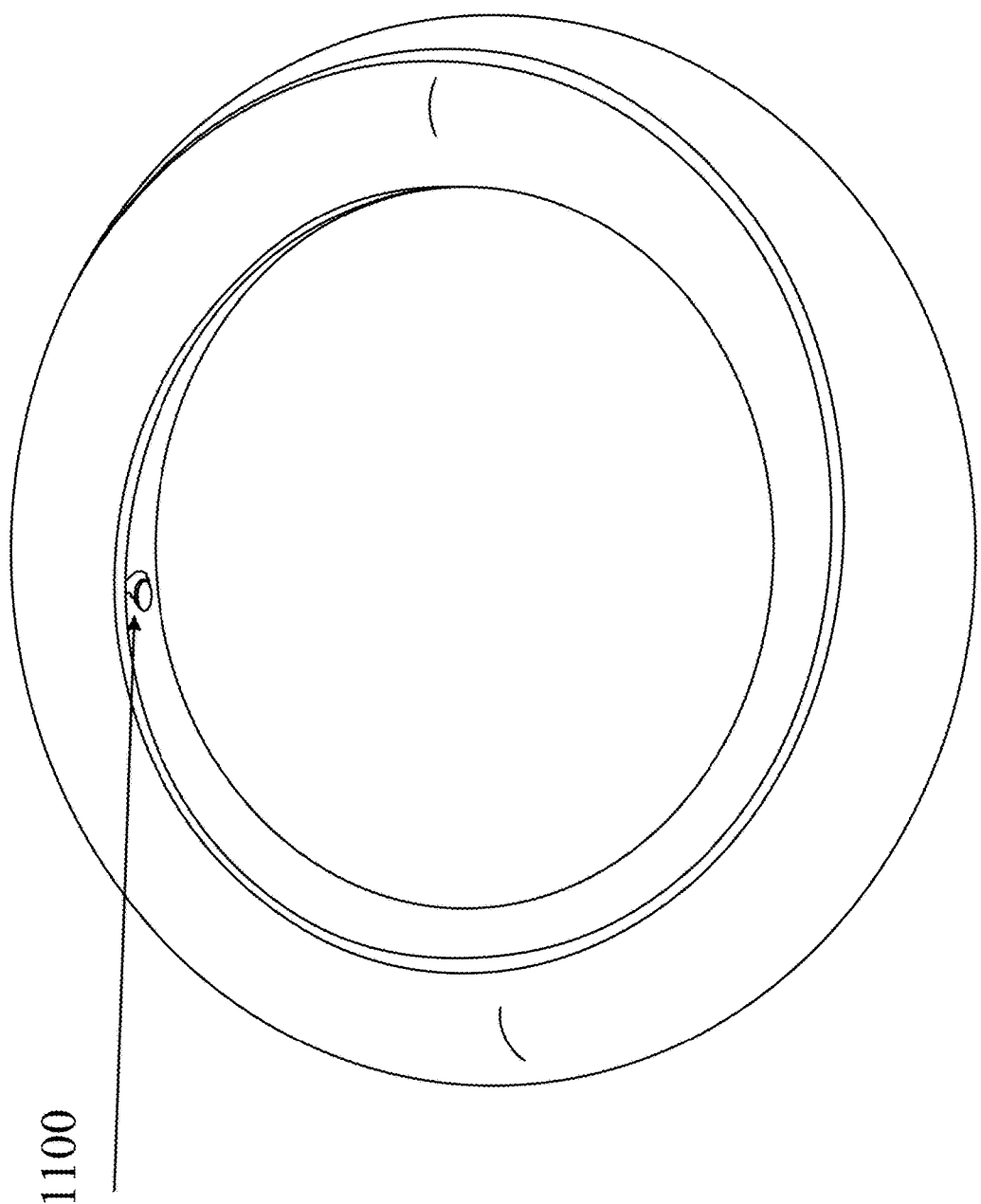
FIG. 11 shows an electroplated antenna with a visible gate contact point.

FIG. 11 shows the mark 1100 from a gate removal after electroplating the antenna, and can be used to identify three-dimensional antennas that undergo the technical processes of using a gate for the disclosed technology.

Figure 12:
FIG. 12 shows another example of an electroplated antenna with a mark from removed gate.

FIG. 12 shows a similar mark 1100 in photograph of a prototype antenna.

Figure 13:
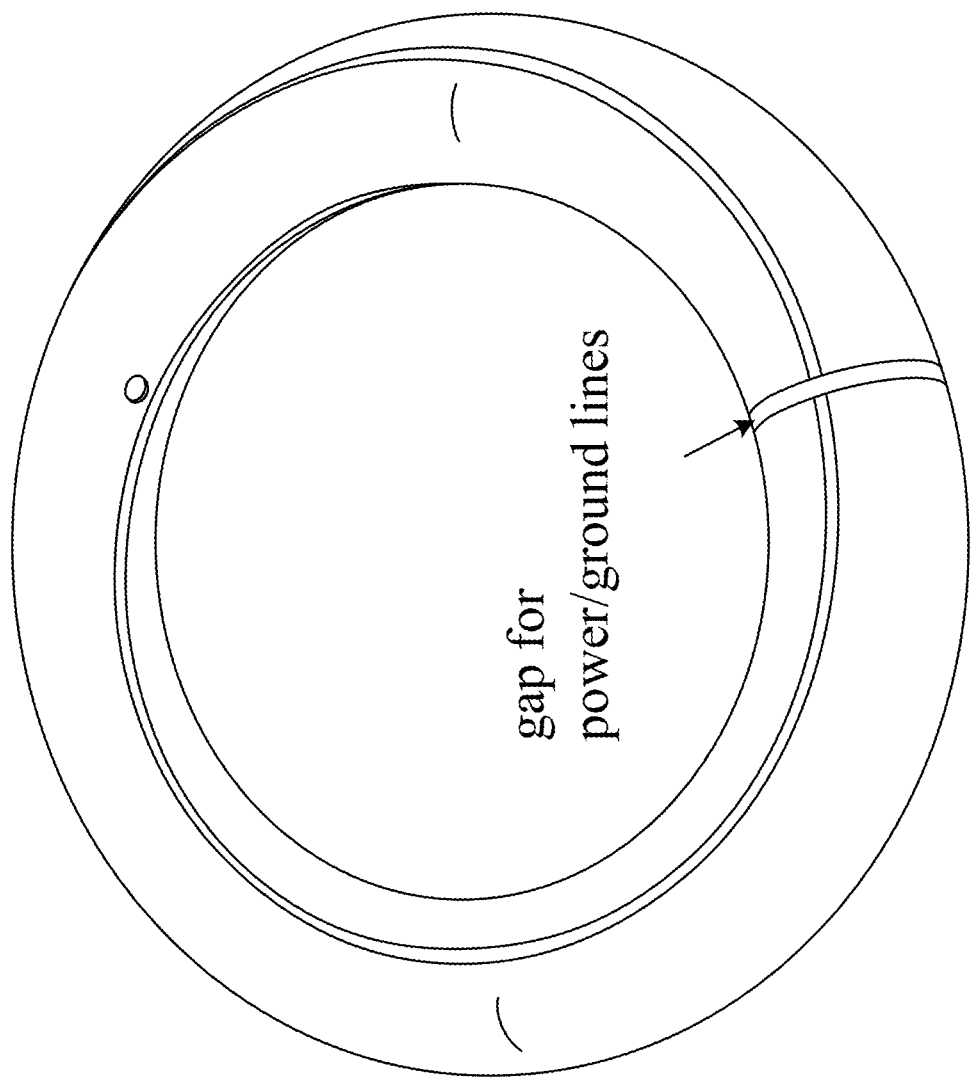
FIG. 13 shows an example of an electroplated antenna with a gap between the ground and power contacts.

FIG. 13 shows a gap separating the power and ground lines of the antenna (similar to the gap 1010). For example, the power and ground lines of FIG. 13 can be electrically connected (see, for example, FIG. 10B) with the electric circuit portion in a device described with respect to FIG. 5B and FIG. 6.

Figure 14:
FIG. 14 shows an example of a three-dimensional antenna having multiple windings in each of the X, Y and Z directions.

FIG. 14 is a photograph of a prototype three-dimensional antenna system in which three antennas are positioned in three orthogonal planes (X, Y and Z). Each antenna may be fabricated using one of the fabrication method described herein.

Figure 15:
FIG. 15 shows another example of a three-dimensional antenna having multiple windings in each of the X, Y and Z directions.

FIG. 15 is a photograph showing the antenna system of FIG. 14 from a different direction.

Figure 16:
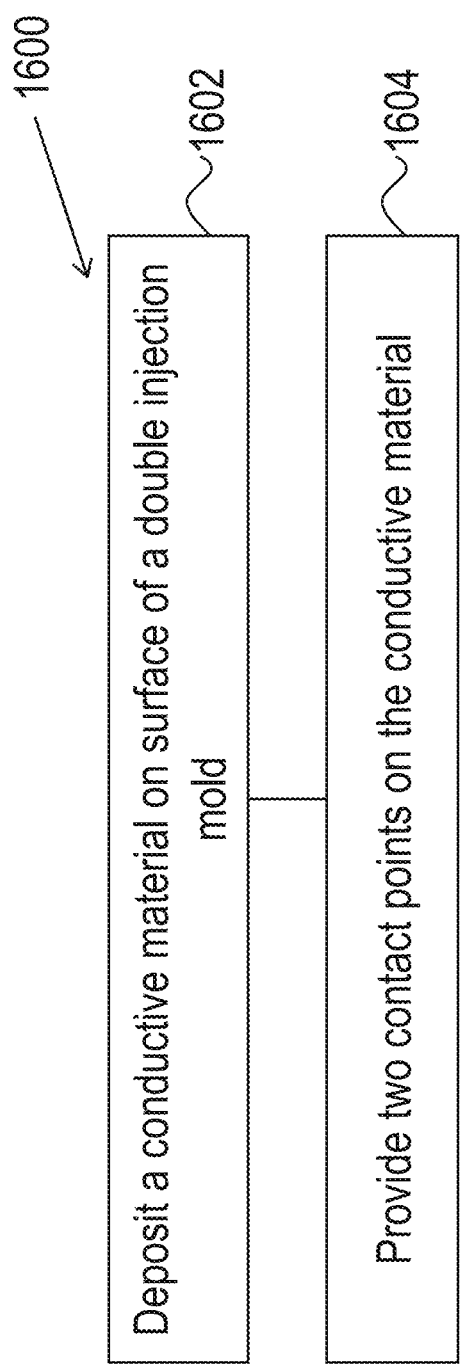
FIG. 16 is a flowchart for a method of antenna fabrication.

FIG. 16 is a flowchart for a method 1600 of antenna fabrication. The method 1600 includes depositing (1602) a conductive material on a surface of a double injection mold that includes a first surface portion comprising a primary material corresponding to a slot of the antenna and a second surface portion comprising an overmold material corresponding to a conductive surface of the antenna such that conductive material does not deposit on the primary material while it deposits on the secondary material, thereby resulting in multiple loops of the conductive material on the surface of the double injection mold, and providing (1604) two contact points to the conductive material, the contact points being separated from each other by a gap in the conductive material.

Figure 17:
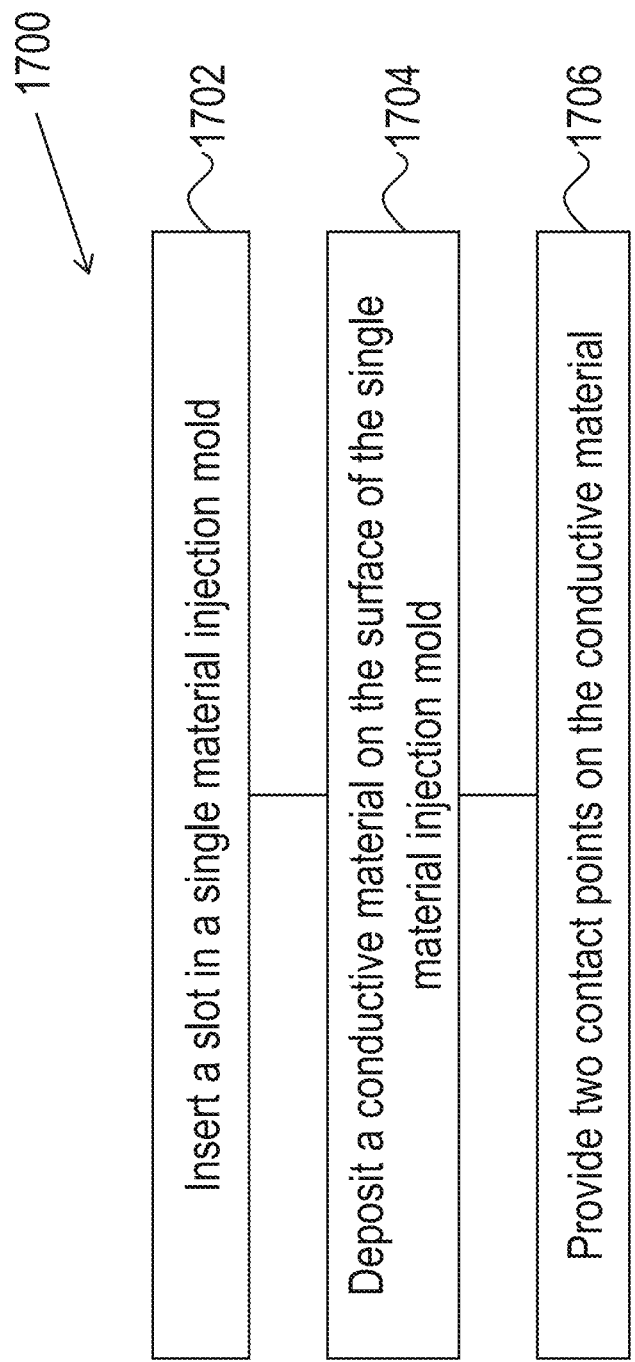
FIG. 17 is a flowchart for another method of antenna fabrication.

FIG. 17 is a flowchart for a method 1700 of antenna fabrication. The method 1700 includes inserting (1702) a slot or a groove in a single material injection mold with a plating-resistant material such that a conductive material does not deposit on the slot or the groove, depositing (1704), after the inserting, a conductive material on a surface of the single material injection mold such that the slot or the groove corresponds to a non-conductive surface of the antenna, thereby resulting in multiple loops of the conductive material, and providing (1706) two contact points to the conductive material, the contact points being separated from each other by a gap in the conductive material.

In various embodiments, the plating-resistant material comprises polycarbonate, polypropylene, or high impact polystyrene plastic. The single material may include ABS plastic, as previously described. The method 1700 may performing the depositing operation 1704 by inserting, using a gate affixed to the single material injection mold, the single material injection mold into a mixture comprising the conductive material, depositing, via electrolysis, the conducting material onto the single material injection mold, and removing, upon completion of the electrolysis, the single material injection mold from the mixture using the gate. As depicted in the drawings, the gate may a cylindrical body having a first end and a second end securely affixable to the single material injection mold. The cross-section of the gate may be variously round or rectangular for easy grasping. After the depositing operation 1704, the gate may be detached from the single material injection mold. In some embodiments, the method 1704 may run two almost full windings of the slot along the length of the antenna coil, thereby resulting in an antenna with three (or more) loops.

Figure 18:
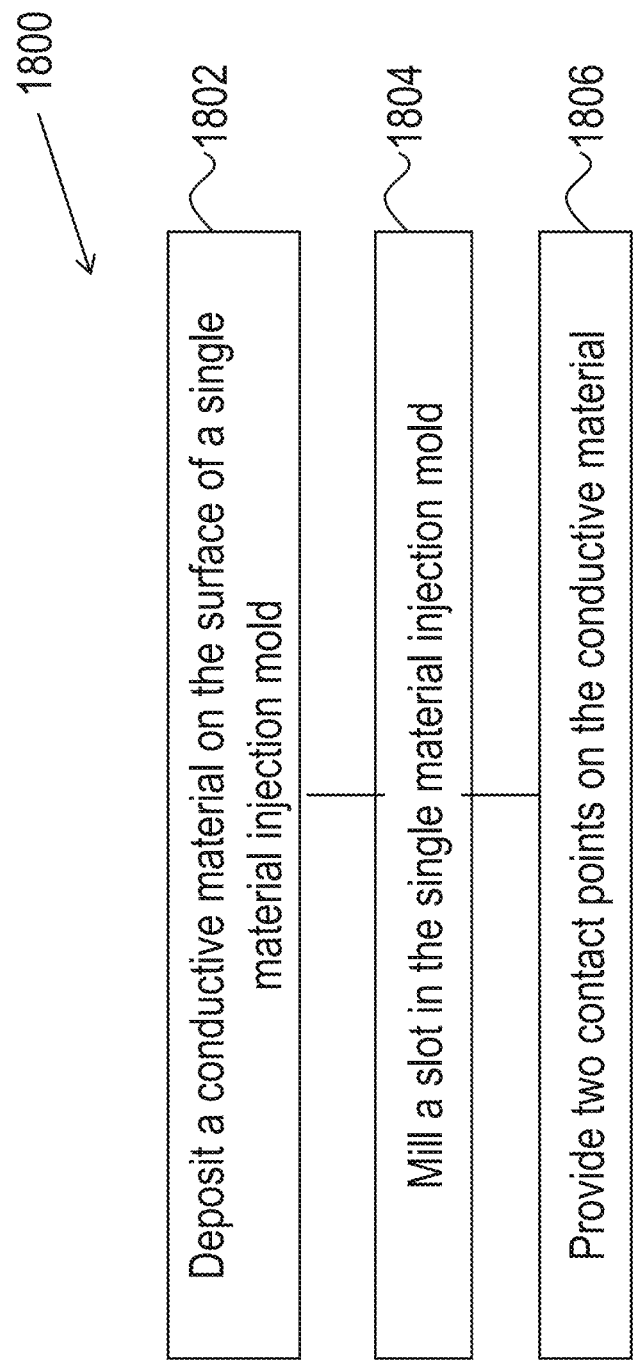
FIG. 18 is a flowchart for another method of antenna fabrication.

FIG. 18 is a flowchart for a method 1800 of antenna fabrication. The method 1800 includes depositing (1802) a conductive material on the surface of a single material injection mold comprising a plastic, milling (1804) a slot or a groove into the plastic after the depositing of the conductive material, thereby resulting in multiple loops of the conductive material on the surface of the plastic, and providing (1806) two contact points to the conductive material, the contact points being separated from each other by a gap in the conductive material.

In some embodiments, the milling operation 1804 may be performed using a computer numerical control (CNC) manufacturing process. In some embodiments, the milling operation 1804 may be performed using a 3-axis or 5-axis machining process in which a manufacturing machine that moves along 3 axes or 5 axes simultaneously is used. For example, such a manufacturing process may produce the slot or the grove via back and forth movement along the X, Y and Z axes and also rotational movement along at least two of these axes. The plastic used in the method 1800 may include ABS plastic. The milling operation 1804 may produce a slot or a grove that runs along the looping or winding dimension of the plastic that then acts as a loop of the antenna. For example, the milling operation may include continuously milling the slot along a length of the single injection mold between one side of the gap and another side of the gap.

The method 1800 is an alternative single-injection molded material with the slot or groove removed with CNC technology after the electrodeposition of the material.

In accordance with the disclosed techniques, a wireless power system embodiment includes a wireless charging transmitter device including a power source electrically coupled to an array of three-dimensional (3D) antennas, wherein each 3D antenna includes a conductive material having multiple windings, wherein the multiple windings are electrically separated from each other by a single continuous slot, wherein the array is arranged such that at least two 3D antennas are acute or perpendicular to each other, and wherein each 3D antenna comprises multiple windings of a conductive material deposited on a surface of a double injection mold to form a first surface portion comprising a primary material corresponding to a slot of the coil and a second surface portion comprising an overmold material corresponding to a conductive portion of the coil. Alternatively, the 3D antenna may include coils that are fabricated using the methods 1700 or 1800.

For example, in some embodiments, a wireless power system may include a wireless charging transmitter device including a power source electrically coupled to an array of three-dimensional (3D) antennas, wherein each 3D antenna includes a conductive material having multiple windings, wherein the multiple windings are electrically separated from each other by a single continuous slot, wherein the array is arranged such that at least two 3D antennas are acute or perpendicular to each other, and wherein each 3D antenna comprises multiple windings of a conductive material deposited on a surface of a single-material injection mold having a slot running along a length of the single-material injection mold to provide electrical isolation to the multiple loops of conductive surface formed by deposition of conductive material on the single-material injection mold. The antenna coil may include two contact points on the conductive material, separated from each other by a gap, for connecting to electrical power and ground signals.

The wireless power system may be designed such that the array is operable to direct an electromagnetic field into or out of the 3D antennas based on a magnetic field produced depending on a flow of electrons through the 3D antennas. The wireless power system. In some embodiments, the array is structured to include three circular 3D antennas arranged to be 90 degrees out-of-phase to one another on an x-axis plane, a y-axis plane and a z-axis plane, respectively.

As previously described, e.g., with respect to FIGS. 2, 3 and 7, in some embodiments, the array includes a first antenna arranged at a top region of the array on the y-axis plane, a second antenna arranged at a bottom region of the array on the y-axis plane and parallel with the first antenna, a third antenna arranged at a first side region of the array on the x-axis plane, a fourth antenna arranged at a second side region of the array on the x-axis plane and in parallel with the third antenna. The first and second antennas are perpendicular to the third and fourth antennas, and a fifth antenna arranged such that it extends horizontally across the array and is perpendicular to the first, second, third, and fourth antennas.

In some embodiments, (e.g., referring to FIGS. 2, 3 and 7), the array includes a first antenna arranged at a top region of the array on the z-axis, a second antenna is arranged at a bottom region of the on about the z-axis plane and in parallel with the first antenna, a third antenna arranged at a first side region of the array on the y-axis, a fourth antenna arranged at a second side region of the array on the y-axis plane and in parallel with the third antenna, a fifth antenna at a third side region that is arranged horizontally at a first intersection of a portion of the first, second, third, and fourth antennas and on the x-axis plane, and a sixth antenna at a fourth side region on the x-axis plane that is arranged horizontally at a second intersection of another portion of the first, second, third, and fourth antennas on the opposing side of the array with respect to the third side.

In some embodiments, a wireless charging transmitter device includes a power source (which may be AC or DC power source), and a coil array electrically coupled to the power source and structured to include two or more coils to produce an electromagnetic field that emanates from the coil array, wherein the coils are arranged such that at least two coils are acute or perpendicular to each other to direct the electromagnetic field. Each coil includes multiple windings of a conductive material deposited on a surface of a double injection mold, or a single material mold that is electroplated and milled with a groove, as described with respect to methods 1700 and 1800, to form a first surface portion comprising a primary material corresponding to a slot of the coil and a second surface portion comprising an overmold material corresponding to a conductive portion of the coil and the wireless charging transmitter device is operable to wirelessly charge an electronic device by providing the electromagnetic field at a receiver coil of the electronic device to convert the electromagnetic energy to electrical energy to power the electronic device. For example, using the method 1800, the coil or antenna may include an electroplated single material injection mold in which a slot is milled to create electrically isolated windings (2 or more) that terminate on one side at a power contact point and the other side at the ground contact point, with the two contact points separated from each other by a gap in the conductive material.

Additional details of such a device are further described in the above-described examples. For example, in some embodiments, the coil array is structured to include a set of elliptic air coils, including (1) a first coil arranged at a top region of the coil array on the y-axis plane, (2) a second coil arranged at a bottom region of the array on the y-axis plane and parallel with the first coil, (3) a third coil arranged at a first side region of the array on the x-axis plane, (4) a fourth coil arranged at a second side region of the array on the x-axis plane and in parallel with the third coil. The first and second coils are perpendicular to the third and fourth coils, and a fifth coil arranged such that it extends horizontally across the coil array and is perpendicular to the first, second, third, and fourth coils. In some embodiments, the coil array may include a set of rectangular air core coils that include: (1) a first coil arranged at a top region of the array on the z-axis, (2) a second coil is arranged at a bottom region of the on about the z-axis plane and in parallel with the first coil, (3) a third coil arranged at a first side region of the array on the y-axis, (4) a fourth coil arranged at a second side region of the array on the y-axis plane and in parallel with the third coil, (5) a fifth coil at a third side region that is arranged horizontally at a first intersection of a portion of the first, second, third, and fourth coils and on the x-axis plane, and (6) a sixth coil at a fourth side region on the x-axis plane that is arranged horizontally at a second intersection of another portion of the first, second, third, and fourth coils on the opposing side of the array with respect to the third side. The device may be operable to cause electromagnetic induction at the receiver coil during a positioning shift by the transmitter device or the receiver device by sending the electromagnetic field from multiple angles of the coils of the array. The placement of the coils in the device may facilitate operation of a receiver coil to undergo free 360-degree movement during operation.

It is intended that the embodiments and implementations described in the specification, together with the drawings, be considered exemplary, where exemplary means an example. As used herein, the singular forms "a", "an" and "the" are intended to include the plural forms as well, unless the context clearly indicates otherwise. Additionally, the use of "or" may include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A method of fabricating an antenna, comprising:
   injecting a first dielectric material into a mold to form a molded part of the antenna, wherein injecting the first dielectric material into the mold to form the molded part comprises forming a slot on the molded part;

filling the slot with a non-conductive electroplating-resistant material;
depositing a conductive material on a surface of the molded part, wherein the non-conductive electroplating-resistant material prevents the conductive material from filling the slot,
wherein the slot corresponds to a non-conductive surface of the antenna thereby resulting in multiple loops of the conductive material, and wherein the depositing the conductive material on the surface of the molded part comprises:
electrodepositing the conductive material on the surface of the molded part using a gate affixed to the molded part, wherein the gate comprises a body securely affixable to the molded part; and,
detaching the gate from the molded part after the depositing; and,
forming two contact on the conductive material, the two contacts being separated from each other by a gap in the conductive material.

2. The method of claim 1, wherein the non-conductive electroplating-resistant material comprises non-conductive glue.

3. The method of claim 1, wherein the first dielectric material comprises an acrylonitrile butadiene styrene (ABS) plastic.

4. The method of claim 1, wherein the multiple loops comprise at least two loops.

5. The method of claim 1, wherein the conductive material deposited on the surface of the molded part comprises a thickness of at least 10 um.

6. The method of claim 1, wherein the slot on the molded part is formed at an angle of around 120 degrees, and wherein the slot comprises three turns around the molded part.

7. The method of claim 1, wherein depositing the conductive material on the surface of the molded part comprises electroplating the molded part without forming breaks or radio frequency (RF) discontinuities in the conductive material thereby increasing an intrinsic quality factor value (Q) of the antenna.

8. The method of claim 7, wherein the intrinsic quality factor value (Q) of the antenna is around 700.

9. The method of claim 1, wherein the gate is affixed to the molded part to contact the molded part at a cross-sectional area that is less than or equal to fifty percent of the diameter of the molded part thereby minimizing a mark formed by detaching the gate from the molded part.

10. The method of claim 1, wherein the gate is affixed on the molded part to fully or partially overlap with the slot.

11. The method of claim 1, wherein injecting the first dielectric material into the mold forms an outer molded part of the antenna, and wherein the method of fabricating the antenna further comprises:
prior to injecting the first dielectric material into the mold to form the outer molded part, injecting a second dielectric material into a mold to form an inner molded part of the antenna, wherein the first dielectric material overlays the second dielectric material.

12. The method of claim 11, wherein the second dielectric material comprises a larger portion of a total dielectric of the antenna than the first dielectric material.

13. The method of claim 11, wherein the second dielectric material comprises at least one of a polycarbonate plastic material or a polypropylene material.

14. The method of claim 11, wherein the non-conductive electroplating-resistant material comprises a non-conductive glue.

15. A method of fabricating an antenna, comprising:
depositing a conductive material on a surface of a molded part, wherein the molded part comprises a dielectric material and wherein the depositing the conductive material on the surface of the molded part comprises:
electrodepositing the conductive material on the surface of the molded part using a gate affixed to the molded part, wherein the gate comprises a body securely affixable to the molded part; and,
detaching the gate from the molded part after the depositing;
milling a groove into the molded part after depositing the conductive material thereby resulting in multiple electrically isolated windings of the conductive material on the surface of the molded part; and,
forming a power contact and a ground contact on the conductive material, the power contact and the ground contact being separated from each other by a gap formed in the conductive material.

16. The method of claim 15, wherein the milling is performed using a computer numerical control (CNC) manufacturing process.

17. The method of claim 15, wherein the dielectric material comprises polypropylene (PP) plastic.

18. The method of claim 15, wherein the antenna comprises a quality factor value (Q) of approximately 1200.

19. The method of claim 15, wherein the gap is formed along a direction orthogonal to the plane of the windings of the conductive material.

* * * * *